United States Patent
Mcconnell et al.

(10) Patent No.: US 12,553,824 B2
(45) Date of Patent: Feb. 17, 2026

(54) MONITORING CONDITIONS AND HEALTH OF ARTISTIC WORKS

(71) Applicant: LDVS, INC., San Marcos, CA (US)

(72) Inventors: Curtis G. Mcconnell, San Marcos, CA (US); Daniel I. Bodenheimer, San Marcos, CA (US); Todd Prentice Coleman, San Marcos, CA (US); Marcelo Aguilar Rivera, San Marcos, CA (US)

(73) Assignee: LDVS, INC., San Marcos, CA (US)

( * ) Notice: Subject to any disclaimer, the term of this patent is extended or adjusted under 35 U.S.C. 154(b) by 152 days.

(21) Appl. No.: 18/555,220

(22) PCT Filed: Apr. 12, 2022

(86) PCT No.: PCT/US2022/024484
§ 371 (c)(1),
(2) Date: Oct. 12, 2023

(87) PCT Pub. No.: WO2022/221323
PCT Pub. Date: Oct. 20, 2022

(65) Prior Publication Data
US 2024/0385108 A1    Nov. 21, 2024

Related U.S. Application Data

(60) Provisional application No. 63/173,942, filed on Apr. 12, 2021.

(51) Int. Cl.
*G01N 21/3504* (2014.01)
*G01J 1/42* (2006.01)

(52) U.S. Cl.
CPC .......... *G01N 21/3504* (2013.01); *G01J 1/429* (2013.01)

(58) Field of Classification Search
None
See application file for complete search history.

(56) References Cited

U.S. PATENT DOCUMENTS 8,624,727 B2 *   1/2014   Saigh ................... A61K 31/045
                                                              340/541
9,395,247 B2 *   7/2016   Kostamovaara ...... G01J 3/4406
(Continued)

FOREIGN PATENT DOCUMENTS

WO    2007072044        6/2007
WO    2016168654 A1    10/2016

OTHER PUBLICATIONS

Extended European Search Report mailed Feb. 4, 2025 in European Patent Application No. 22788799.9, 10 pages.
(Continued)

*Primary Examiner* — David P Porta
*Assistant Examiner* — Djura Malevic
(74) *Attorney, Agent, or Firm* — Perkins Coie LLP

(57) ABSTRACT

Disclosed are devices, systems, and methods for remote and quantitative monitoring of, analysis of, and/or response to the internal conditions of a physical object (e.g., an artistic work) and the external microenvironment impacting the physical object. In some aspects, an art tracker device for monitoring health of an artwork includes a substrate inconspicuously, unobtrusively, and noninvasively attachable to the artwork: one or more of sensors that monitor an internal condition of the artwork itself and/or an external condition from a microenvironment surrounding a portion of or the whole artwork: a controllable power supply unit to selectively power device components: a processing unit that processes sensor outputs as data associated with the detected conditions of the artwork; and a communications unit to wirelessly transmit the data to a remote device.

25 Claims, 15 Drawing Sheets

(56) References Cited

U.S. PATENT DOCUMENTS

| | | | |
|---|---|---|---|
| 10,001,809 B2* | 6/2018 | Seo | G09F 27/005 |
| 10,297,572 B2* | 5/2019 | Dalal | H01L 24/50 |
| 10,505,726 B1 | 12/2019 | Andon et al. | |
| 10,582,618 B2* | 3/2020 | Coleman | H05K 3/061 |
| 10,811,799 B2* | 10/2020 | Holec | H05K 1/142 |
| 10,840,536 B2* | 11/2020 | Rogers | H01L 21/54 |
| 10,867,914 B2* | 12/2020 | Dardona | H01L 21/76895 |
| 11,113,554 B2* | 9/2021 | McConnell | G06V 10/143 |
| 11,126,909 B2* | 9/2021 | Bryant | G06K 19/07798 |
| 11,568,353 B2* | 1/2023 | Davis | G06Q 10/0833 |
| 11,756,322 B2* | 9/2023 | McConnell | G06V 10/143 |
| | | | 382/108 |
| 12,272,165 B2* | 4/2025 | McConnell | G06V 20/10 |
| 12,277,008 B2* | 4/2025 | Seki | G06F 1/1652 |
| 2007/0247317 A1* | 10/2007 | Farrell | G06K 19/07381 |
| | | | 340/572.3 |
| 2008/0212840 A1* | 9/2008 | Shalom | G01B 11/24 |
| | | | 382/108 |
| 2008/0291225 A1* | 11/2008 | Arneson | G06F 3/147 |
| | | | 345/698 |
| 2009/0154778 A1* | 6/2009 | Lei | G06V 30/413 |
| | | | 382/112 |
| 2009/0317639 A1* | 12/2009 | Axisa | H05K 1/0283 |
| | | | 428/411.1 |
| 2010/0097208 A1* | 4/2010 | Rosing | G06Q 10/087 |
| | | | 340/572.1 |
| 2011/0127432 A1* | 6/2011 | Federici | G01N 33/146 |
| | | | 250/341.1 |
| 2012/0175866 A1 | 7/2012 | Kisters | |
| 2013/0183924 A1* | 7/2013 | Saigh | A61K 9/08 |
| | | | 455/404.2 |
| 2014/0058198 A1* | 2/2014 | St. George | H04N 7/18 |
| | | | 600/249 |
| 2015/0220119 A1* | 8/2015 | Seo | G09G 5/37 |
| | | | 345/173 |
| 2015/0262461 A1 | 9/2015 | Richter | |
| 2015/0369666 A1* | 12/2015 | Kostamovaara | G01N 21/65 |
| | | | 250/459.1 |
| 2017/0079144 A1* | 3/2017 | Coleman | H05K 3/4644 |
| 2017/0214522 A1 | 7/2017 | Code et al. | |
| 2017/0263011 A1* | 9/2017 | Yalniz | G06V 20/10 |
| 2020/0005284 A1 | 1/2020 | Vijayan | |
| 2020/0051015 A1* | 2/2020 | Davis | G06Q 10/08 |
| 2020/0092683 A1* | 3/2020 | Fyfe | H04L 67/125 |
| 2020/0311452 A1* | 10/2020 | McConnell | G06V 20/10 |
| 2020/0372318 A1* | 11/2020 | Bryant | H04B 5/77 |
| 2021/0217001 A1 | 7/2021 | Harrison | |
| 2022/0006642 A1* | 1/2022 | Maj | H04L 9/3239 |
| 2024/0161526 A1* | 5/2024 | McConnell | G06V 10/143 |
| 2024/0385108 A1* | 11/2024 | McConnell | G01N 21/3504 |
| 2025/0209434 A1 | 6/2025 | McConnell et al. | |
| 2025/0225806 A1 | 7/2025 | McConnell et al. | |
| 2025/0264307 A1* | 8/2025 | Ebrahimi Afrouzi | H04N 23/56 |

OTHER PUBLICATIONS

International Search Report and Written Opinion mailed Jul. 3, 2023 in International Patent Application No. PCT/US23/16456, 21 pages.

Deoitte ArtTactic, Art & Finance Report 2016, 4th Edition, 160 pages.

Examination Report mailed Apr. 20, 2023 in European Patent Application No. 18866860.2, 5 pages.

Extended European Search Report mailed Jun. 8, 2021 in European Patent Application No. 18866860.2, 8 pages.

International Search Report and Written Opinion mailed Jan. 8, 2019 in International Patent Application No. PCT/US18/55076, 12 pages.

International Search Report and Written Opinion mailed Jul. 14, 2022 in International Patent Application No. PCT/US22/24484, 20 pages.

* cited by examiner

MONITORING CONDITIONS AND HEALTH OF ARTISTIC WORKS

CROSS-REFERENCE TO RELATED APPLICATIONS

This patent document is a National Phase of International Patent Application No. PCT/US22/24484, entitled "MONITORING CONDITIONS AND HEALTH OF ARTISTIC WORKS," filed on Apr. 12, 2022, which claims priorities to and benefits of U.S. Provisional Patent Application No. 63/173,942 entitled "MONITORING CONDITIONS AND HEALTH OF ARTISTIC WORKS" filed on Apr. 12, 2021. The entire contents of the aforementioned patent applications are incorporated by reference as part of the disclosure of this patent document.

TECHNICAL FIELD

This patent document relates to system, apparatuses, and techniques for remote, quantitative monitoring of environment-sensitive physical objects in real-time, including artistic works, high-value artifacts, collectibles, luxury products and high-end consumer goods.

BACKGROUND

Art is the manifestation of human expression or creative skill and imagination, typically in a visual format such as painting or sculpture, an audio format such as music, or a mixture of both such as a performance, in which the produced artistic work is for appreciation and enjoyment for its attributes, beauty, message, meaning, significance, symbolism, and/or other aspects. Some of the oldest documented forms of art are visual arts that represent creation of images and objects. Visual artistic works include paintings, drawings and sketches, sculptures, printmaking, photography, and other visual media. Paintings are among the most common in the visual or fine arts. A painting is typically assembled by applying a form of paint, pigment or other color medium to a support surface, e.g., such as a fabric base or a wooden panel. The support surface typically includes a ground layer, which provides a smooth surface for receiving the paint and absorbing excess binding media of the paint. In some instances, the top layers of a painting have a coating applied to provide saturation and to protect the paint underneath from dirt, abrasion and moisture.

It is environmental conditions and factors like dirt, abrasion, and moisture, as well as others like temperature, light, mold spores, pests, etc., that silently diminish if not destroy artistic works. As a consequence, challenges arise in protecting and preserving these artistic works, which can affect their value, as well as preservation of culture. Decades have passed, and even with modern technology, there has been little to no innovation developed to safeguard artistic works and high-value physical products from the dangerous, harmful, and often invisible threats that surround them.

SUMMARY

Disclosed are devices, systems, and methods for remote and quantitative monitoring, analysis, and/or response of/to the internal conditions of a physical object (e.g., an artistic work) and the immediate external environment impacting the physical object. In addition to monitoring, analyzing, and/or responding to potentially detrimental internal conditions and immediate external environmental conditions on the physical object, The disclosed devices, systems, and methods can also remotely and quantitatively monitor, analyze, and/or react to location and positional changes of the physical object.

In some implementations of the disclosed devices, systems, and methods, a miniaturized, conformable, autonomous sensor and/or actuator device is reversibly attachable to an artistic work such as a painting, sculpture, drawing, etc, and in continuous or intermittent wireless communication with a data receiving and/or processing device, which may also be in communication with a network of computing systems, e.g., in the cloud, operating as a platform. Example embodiments of the disclosed devices, systems, and method may be referred to herein as the "art tracker."

In example embodiments, an art tracker device is configured to: attach to any work of art (and various types of high-value physical object) for the purpose of actively monitoring internal and external environmental conditions being experienced by the art work; provide real-time and near-time data to a central data portal to allow for real-time alerting to interested parties; generate a digital audit trail of all environmental variables to allow for better evaluation and analysis of risks in the future for the specific art work, as well as for similar art work (or physical object) being maintained on the art tracker platform; and/or provide local (e.g., device-side) intelligence to increase the frequency of alerts or sampling/measuring rate when the art work (or physical object) is at risk, including while optimizing battery life when the object is in stasis.

In some aspects, an art tracker device for monitoring health of an art work includes a substrate capable of attaching to an artistic work or accessory associated with the artistic work; a plurality of sensors disposed on the substrate and operable to monitor (i) an internal condition that impacts a region or material component of the artistic work itself, (ii) an external condition from a microenvironment of the artistic work that impacts a portion or a whole of the artistic work, or (iii) both the internal condition and the external condition, the plurality of sensors comprising a first sensor and a second sensor, wherein the first sensor is operable to detect a first parameter associated with the internal condition and/or the external condition, and the second sensor is operable to detect a second parameter associated with the internal condition and/or the external condition; a power supply unit comprising a power source and a control circuit, the power supply unit operable to provide electrical energy to at least some components of the art tracker device; a data processing unit including a processor and a memory disposed on the substrate and in communication with the plurality of sensors and the power supply unit, wherein the data processing unit is configured to process outputs of the plurality of sensors as data associated with the internal condition of the artistic work, the external condition from the microenvironment of the artistic work, or both the internal condition and the external condition, and wherein the data processing unit is configured to command the control circuit to allow the electrical power to be drawn from the power source by the electronic components of the art tracker device based on the data associated with the internal condition of the artistic work, the external condition from the microenvironment of the artistic work, or both the internal condition and the external condition; and a communications unit disposed on the substrate to wirelessly transmit, to a remote device, one or both of the outputs of the plurality of sensors and the data of the data processing unit.

In some aspects, an art tracker device for monitoring health of an art work includes a substrate capable of attaching to an artistic work or accessory associated with the artistic work; a plurality of sensors disposed on the substrate and operable to monitor (i) an internal condition that impacts a region or material component of the artistic work itself, (ii) an external condition from a microenvironment of the artistic work that impacts a portion or a whole of the artistic work, or (iii) both the internal condition and the external condition, the plurality of sensors comprising a first sensor and a second sensor, wherein the first sensor is operable to detect a first parameter associated with the internal condition and/or the external condition, and the second sensor is operable to detect a second parameter associated with the internal condition and/or the external condition; a power supply unit comprising a power source and a control circuit, the power supply unit operable to provide electrical energy to at least some components of the art tracker device; a data processing unit including a processor and a memory disposed on the substrate and in communication with the plurality of sensors and the power supply unit, wherein the data processing unit is configured to process outputs of the plurality of sensors as data associated with the internal condition of the artistic work, the external condition from the microenvironment of the artistic work, or both the internal condition and the external condition, and wherein the data processing unit is configured to command the control circuit to allow the electrical power to be drawn from the power source by the electronic components of the art tracker device based on the data associated with the internal condition of the artistic work, the external condition from the microenvironment of the artistic work, or both the internal condition and the external condition; and a communications unit disposed on the substrate to wirelessly transmit, to a remote device, one or both of the outputs of the plurality of sensors and the data of the data processing unit.

In some aspects, a device for monitoring conditions of a physical object includes a substrate capable of attaching to the physical object; one or more sensors disposed on the substrate and operable to continuously or intermittently monitor at least one of (i) an internal condition that impacts a region or material component of the physical object itself, or (ii) an external condition from a microenvironment of the physical object; a power supply unit comprising a power source and a control circuit, the power supply unit operable to provide electrical energy to at least some components of the device; and a communications unit disposed on the substrate to wirelessly transmit, to a remote device, a transmission signal including information associated with an output of the one or more sensors.

In some aspects, a method for monitoring health of an art work includes detecting, by one or more sensors disposed on a substrate of a device that is attached to an artistic work or an accessory associated with the artistic work, one or both of an internal condition that impacts a region or material component of the artistic work itself and an external condition from a microenvironment of the artistic work that impacts a portion or a whole of the artistic work; processing, by a processor of the device, data associated with the internal condition of the artistic work, the external condition from the microenvironment of the artistic work, or both the internal condition and the external condition to produce health information about the artistic work; and wirelessly transmitting, to a remote device the processed data associated with the internal condition of the artistic work, the external condition from the microenvironment of the artistic work, or both the internal condition and the external condition.

DETAILED DESCRIPTION

Figure 1A:
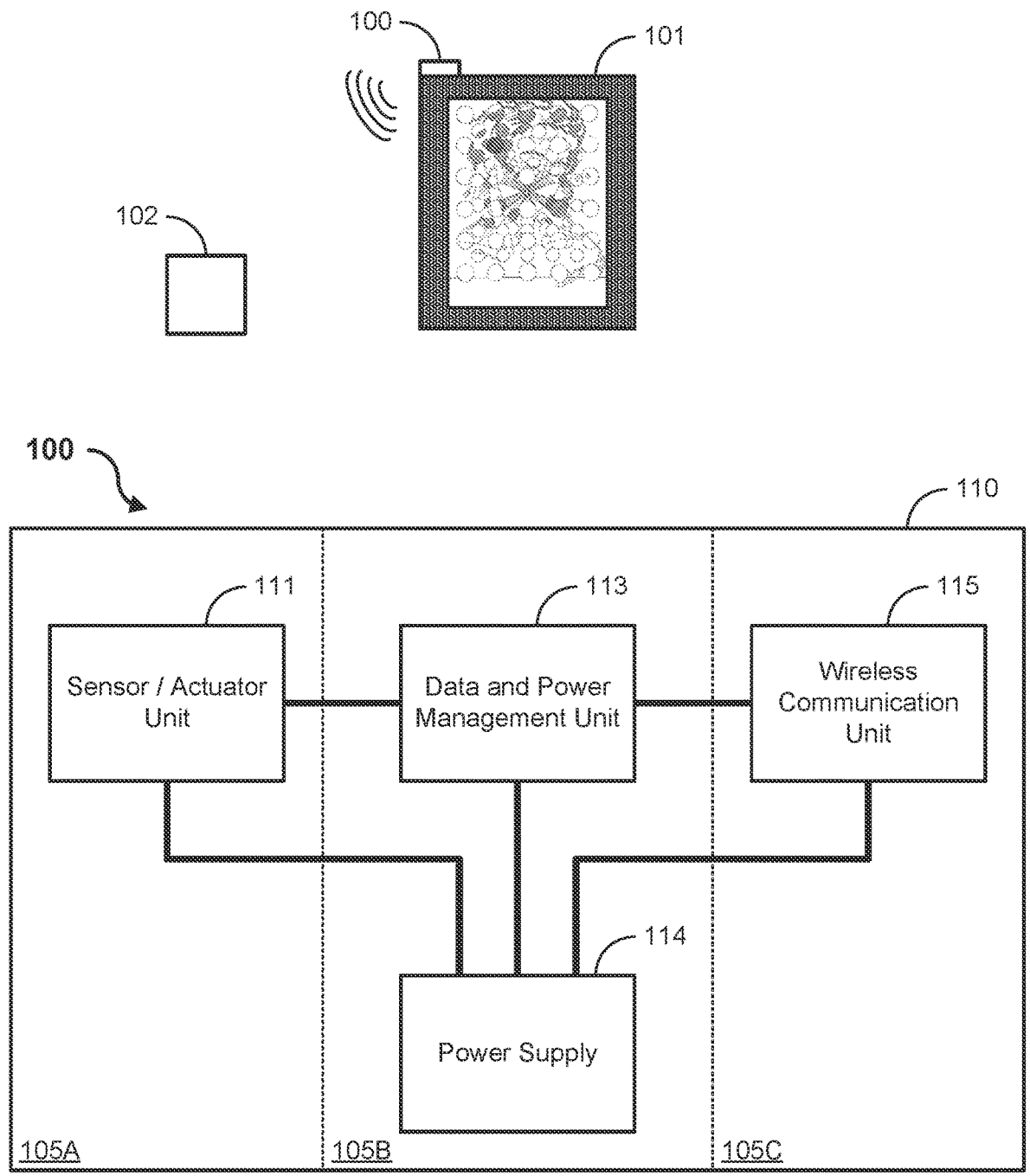
FIG. 1A shows a diagram of an example embodiment of an art tracker device in accordance with the present technology.

Paintings, particularly those produced by the great artistic masters (e.g., like Da Vinci, Raphael, van Gogh, O'Keefe, Picasso, Warhol, Basquiat, and many more), make up the majority of the most famous (e.g., most recognizable) and most expensive artistic works in the world. Yet, even these great works are slowly and constantly harmed by the conditions within which they are kept and/or displayed.

Like humans, art works gradually deteriorate with age. Certain environmental factors can greatly contribute to the premature aging and damage to any work of art. Specifically, a variety of media each react very differently to environmental factors, such as humidity, temperature, light exposure (especially from ultraviolet (UV) and infrared (IR) light), vibration and impact. Many of these environmental factors affect the art work within a 'microenvironment' or 'microclimate' of the overall environment the art work is residing, such as a large room of a museum, gallery, living room, etc. The microenvironment of the art work may be just a few to tens or hundreds of square centimeters of volume at and around the artistic work, or even at and around a portion of the artistic work.

As an illustrative example, a painting mounted to an east-facing wall that receives morning light from a skylight every morning 300 days a year may create a unique microenvironment of UV and IR light, relative humidity, and temperature on all or a part of the painting than other portions of the same east-facing wall, let alone from the bulk of the room. Similarly, for example, this same painting may also happen to be two meters from an air conditioning vent on the ceiling, whose fins direct air upon the painting on the east-facing wall, slowly but consistently damaging the painting every cycle the air flow currents of the air condition blow from the vent, but are innocuous to room temperature, humidity, or pressure sensors and negligible upon other portions of the wall or in the room as a whole.

Effectively managing environmental variables can extend the life of a work of art and protect it from irreparable harm. And effectively monitoring these variables can contribute greatly to proactive conservation and better quantifying risk. Furthermore, by continuous monitoring an art work, parties of interest can be alerted to possible increased risk factors allowing them to take immediate action to prevent damage. And in the worst case where damage does occur, parties of interest can more effectively determine the cause and determine accountability.

Measuring, monitoring, and alerting on environmental variables, while highly desirable, has historically been seen as prohibitively expensive and technically infeasible on a large scale. In particular, measuring, monitoring, and alerting about microenvironmental variables on individual artistic works is not well recognized and nor practiced at any scale, as effective means to do so do not presently exist. Instead, only primary risk factors to art works are presently addressed, which mainly pertain to catastrophic issues, like seismic events, theft, and the aggregate humidity or temperature of the room the art work is housed. Furthermore, these minimal efforts are limited, and hence any active monitoring has been reserved for very select art works; yet even then, the primary focus has been controlling the room environment—not the microclimate associated with the art work itself. To date, there have been no existing techniques for monitoring the internal conditions of the art work, such as the tensions applied on a painting's canvas by the painting's frame (particularly over time, as the frame may undergo physical changes, like warping or resetting due to user handling), or such as the changes in temperatures and humidity incident upon the painting from air flow currents in the room where the painting is housed, or such as vibrational applied on the painting from routine inconspicuous activities (e.g., buffing of the room's floor) or unmonitored events (e.g., subway motion).

Beyond the cost of measuring environmental variables, let alone internal forces exerted on the art, for each art work individually, solving this problem has been hampered by concerns of doing more harm than good or fearing that technology would actually put the art at risk. Also, there has been a general perception that the equipment necessary for this would be incompatible with the aesthetic desired to present beautiful art.

Technically to solve this problem, sensors/devices would need to be small and unobtrusive, have a reliable wireless power source in low light environment, have the ability to communicate wirelessly with a computer or network, and be highly portable so that it can travel with the art itself.

Thus, the art market and society as a whole would greatly benefit from improved scientific and technical monitoring and analysis techniques that track the health of the art work, and not just conditions of the room or surroundings. For example, with proper scientific and technology-based techniques to characterize (i) the internal conditions of the art works, including but not limited to mechanical stresses, region-specific incident light, etc., and (ii) the immediate external or microenvironment conditions subject to the artistic works, including but not limited to localized temperature and temperature gradients, localized humidity, incident airflows, applied vibrations, etc., stakeholders like artists, art owners, curators, and art lovers alike would be brought confidence and security that an artistic work is safe from detriment or destruction. Moreover, such scientific and technology-based monitoring and characterization techniques could allow investors to protect their assets through indisputable evidence that the monitored art work has not been tampered or substituted, whether in stasis or in transmit, and thus provide a foundation of a digital audit trail for art. As such, these and other problems can be mitigated, if not eliminated, by employment of scientific and technology-based monitoring and characterization techniques, subject of the present technology.

Disclosed are devices, systems, and methods for remote and quantitative monitoring, analysis, and/or response of/to the internal conditions of a physical object (e.g., an artistic work) and the external microenvironment impacting the physical object. In addition to monitoring, analyzing, and/or responding to potentially detrimental internal conditions and immediate external environmental conditions on the physical object, the disclosed devices, systems, and methods can remotely and quantitatively monitor, analyze, and/or react to location and positional changes of the physical object.

While the disclosed embodiments are described herein primarily based on remotely monitoring and quantitatively characterizing external and internal conditions of artistic works, such as paintings, sculptures, drawings, photography, printed material, etc., to facilitate understanding of the underlying concepts, it is understood that the disclosed embodiments can also include remotely monitoring and quantitatively characterizing unique features of other physical objects, like luxury or high-end goods, such as wine, jewelry, clothing, and the like, or non-luxury physical object, such as perishable items like food, packages, or other objects. Example embodiments of the disclosed devices, systems, and method may be referred to herein as the "art tracker," but are not limited to monitoring, analyzing, and/or responding to the external and internal conditions of artistic works and can be implemented for other physical objects. Also, the terms "art work," "artwork," and "artistic work" are used interchangeably.

FIG. 1A shows a diagram of an example embodiment of an art tracker device 100 in accordance with the present technology, operable to remotely, continuously and quantitatively monitor, analyze, and/or react to (i) internal conditions of a physical object 101, such as an artistic work, that the art tracker device 100 can inconspicuously attach to, and/or (ii) external environment impacting the physical object 101 (e.g., the microenvironment within microns, millimeters or centimeters of a surface of the physical object 101, or additionally or alternatively the macroenvironment surrounding the physical object 101). In some example implementations of the art tracker device 100, the immediate external environment conditions of the microenvironment impacting the physical object 101 includes a volume at least partially encompassing the physical object 101 (e.g., one or more portions of the physical object 101 or the whole of the physical object 101), where the microenvironment volume can be in a range of 0 μm to 100 μm, or in range of 0 μm to 10 mm, or in a range of 0 μm to 10 cm, e.g., depending on the kind of external microenvironment condition. For example, an external airflow current condition incident on or humidity condition exposed to the physical object 101 can be indicative of a larger microenvironment (e.g., which could be in millimeters or centimeters) than a potentially harmful light incident on or temperature condition exposed to the physical object 101 (e.g., which could in the microns or millimeters).

The art tracker device 100 includes a plurality of modular electronic modules disposed on a substrate (attachable to the physical object 101 (e.g., art work 101 or artistic work 101)) and in data communication to, inter alia, detect physical phenomena (via sensing), analyze the detected phenomena (via data processing), transmit data, and/or modulate power. As depicted in FIG. 1A, in some embodiments, the art tracker device 100 includes a sensor and/or actuator unit 111, a data and power management unit 113, a wireless communication unit 115, and power supply 114 on a substrate 110. In some embodiments, for example, the substrate 110 can include a flexible and/or stretchable and/or electrically-insulative and/or heat-insulating material, where the substrate 110 is able to attach and conform to the physical object 101 inconspicuously, unobtrusively, and noninvasively, also referred to as the "conformal substrate." In some implementations, for example, the art tracker device 100 is in wireless communication with a remote data acquisition, storing and/or processing platform 102 configured to obtain the internal and/or external condition information about the artistic work 101 as detected and/or pre-processed by the art tracker device 100.

Substrate

The substrate 110 (e.g., including the conformal substrate) of the art tracker device 100 is configured to attach to an artistic work in a manner that is non-destructive or non-deleterious to the artistic work 101. The substrate 110 can be made of a durable, adhesive material that allows for reversible attachability of the art tracker device 100 to the artistic work 101, where when removed the conformable substrate 110 does not deposit adhesive substances onto the artistic work 101. The conformable substrate 110 can include (or be) a flexible and/or stretchable material, e.g., including but not limited a silicone (e.g., such as Polydimethylsiloxane (PDMS), Tegaderm, or other), fluoropolymer (e.g., such as Teflon (PTFE)), or other flexible and/or stretchable material. In some instances, the substrate 110 includes multiple materials where an external layer provides an adhesive surface upon a base (flexible and/or stretchable) substrate layer. In addition to attachment and securement of the art tracker device 100 to the artistic work 101, the conformable substrate 110 provides support for flexible and/or stretchable electronic units or modules that carry out the functionalities of the device 100. In some embodiments, the substrate 110 can be segmented as separable substrate regions, which device components of the art tracker device 100 on each separable substrate region can be in wired or wirelessly communication with other device components of the device.

Sensor and/or Actuator Unit(s)

The sensor and/or actuator unit 111 of the art tracker device 100 is operable to monitor a multitude of internal factors of the artistic work 101 itself and external, environmental conditions present upon the artistic work 101, e.g., due to its surroundings. In some implementations, the sensor and/or actuator unit 111 is operable to perform certain functions in response to data analysis of the monitored internal factors and/or external conditions. For example, an internal condition of the artistic work 101 can include, but is not limited to, a material property of a material or materials or component or components of the artistic work itself, such as a color, a texture, a hardness, a porosity, etc.; a mechanical force propagating in the artistic work, such as a tension in a material or materials or component of the artistic work 101; an electrical property of a material or component of the artistic work; a hydrophilicity or hydrophobicity of a material or component of the artistic work 101; or other internal property. For example, an external condition from the microenvironment of a portion or the whole of the artistic work 101 that can harm or threaten the health of the artistic work 101 can include, but is not limited to, localized temperature, humidity, barometric pressure, concentration of particulates in air indicative of the air quality, an amount and/or frequency of light, a vibration, an applied strain or stress, or an instantaneous movement localized in the microenvironment volume or area at the portion or the whole of the artistic work 101.

Various embodiments of the sensor and/or actuator unit 111 can include a plurality of sensors, including but not limited to a temperature sensor, a humidity sensor, a micro-vibrational sensor, a movement sensor (e.g., such as an accelerometer and/or gyroscope), a pressure sensor (e.g., a force sensitive resistor (FSR) or a strain gauge), an air quality sensor, and/or an optical sensor to detect light of certain optical spectra. In various embodiments, the sensor and/or actuator unit 111 can include a geo-location monitor, such as a GPS module and/or utility Wi-Fi communications (such as a Wi-Fi hotspot location) or other geo-location methods, to determine a precise location of the art tracker device 100, and hence the artistic work 101 to which the art tracker 100 is attached. Such location information can be used to trigger alerts based on geo-fencing protocols, e.g., so that impermissible locational changes of the artistic work 101 can be immediately flagged to alert security.

In some embodiments of the sensor and/or actuator unit 111, the temperature sensor can be configured to detect the temperature of its surroundings and output the detected temperature level in real time. Moreover, the sensor and/or actuator unit 111 can produce an alert when the detected temperature is at or above a high temperature threshold and at or below a low temperature threshold, where such thresholds are selected based on the type of the physical object 101, such as at or above 25° C. or at or below 15° C., respectively (e.g., as certain artistic works like paintings should preferably be stored at 15° C. to 25° C.). In various implementations, the temperature sensor can be configured to monitor and determine (e.g., and alert for) certain fluctuations of temperature, such as rapid heat or cold temperature spikes even if lasting for only a few minutes or seconds. In some implementations, for example, the temperature sensor can be configured to monitor and determine (e.g., and alert for) for temperature fluctuations based on first or second derivatives of the fluctuation (i.e., rate or acceleration of change) and/or magnitude of the fluctuation; and the art tracker device 100 can alert or allow temperature fluctuations based on programmable threshold(s), e.g., such as alert for fluctuations equal to or greater than +/−4° C. per 24 hr and allow fluctuations of equal to or less than +/−4° C. per 24 hr. In some implementations, for example, two or more art tracker devices 100 can be placed on the artistic work 101 in disparate locations such that the detected data by the temperature sensors of each art tracker device 100 can be used to generate a heat (temperature) gradient map on localized regions of the art work itself.

In some embodiments of the sensor and/or actuator unit 111, the humidity sensor can be configured to detect the relative moisture (humidity) of its surroundings and output the detected humidity level in real time. Moreover, the sensor and/or actuator unit 111 can produce an alert when the detected humidity is at or above a high humidity threshold and at or below a low humidity threshold, where such thresholds are selected based on the type of the physical object 101, such as at or above 45% humidity and 55% humidity, respectively (e.g., as certain artistic works like paintings should preferably be stored at 45% to 55% humidity). In various implementations, the humidity sensor can be configured to monitor and determine (e.g., and alert for) certain fluctuations of humidity, such as rapid changes in moisture even if lasting only a few seconds or minutes. In some implementations, for example, the humidity sensor can be configured to monitor and determine (e.g., and alert for) for humidity fluctuations based on first or second derivatives of the fluctuation (i.e., rate or acceleration of change) and/or magnitude of the fluctuation; and the art tracker device 100 can alert or allow humidity fluctuations based on programmable threshold(s), e.g., such as alert for fluctuations equal to or greater than +/−5% per 24 hr and allow fluctuations of equal to or less than +/−5% per 24 hr. In some implementations, for example, two or more art tracker devices 100 can be placed on the artistic work 101 in disparate locations such that the detected data by the humidity sensors of each art tracker device 100 can be used to generate a moisture (humidity) gradient map on localized regions of the art work itself.

In some embodiments of the sensor and/or actuator unit 111, the micro-vibrational sensor can be configured to detect subtle movements of the art tracker device 100 (and hence, the artistic work 101), which can be indicative of both external conditions and internal conditions of the artistic work. For example, the micro-vibrational sensor provides impact monitoring and identification of potential tampering by outside forces, such as detecting the manner a person may handle the artistic work 101 while carrying it. Similarly, the micro-vibrational sensor also can quantitatively characterize internal effects on the artistic work, whether caused by internal or outside sources. Also, for example, the micro-vibrational sensor can detect both pronounced and subtle mechanical forces exerted on the artistic work 101, including but not limited to: vibration caused by underground subway and moving trains that are proximate to the location of the artistic work 101 (e.g., within half a kilometer); in-transit vibration caused by uneven roads, air turbulence or vehicle resonance; nearby seismic activity, including man-made activity like construction; the use of heavy equipment, such as forklifts, often employed when moving an art work packaged in a crate in storage locations; and even walking/foot traffic caused by viewers themselves while moving in a gallery, museum, or other location for viewing art.

As an illustrative example, the micro-vibrational sensor can quantify the mechanical forces experienced by the artistic work 101 due to an earthquake; and the micro-vibrational sensor can determine micro-stresses and strains on certain portions of the artistic work 101 where the art tracker device 100 is disposed, e.g., over lengthy periods of time. In various implementations, the micro-vibrational sensor can be configured to monitor and determine (e.g., and alert for) damage levels of motion and forces exerted on the artistic work 101, which can be in a range of 0.2 g to 0.6 g. In some implementations, for example, the micro-vibrational sensor can be configured to monitor and determine (e.g., and alert for) for vibration fluctuations based on first or second derivatives of the fluctuation (i.e., rate or acceleration of change) and/or magnitude of the fluctuation; and the art tracker device 100 can alert or allow vibration fluctuations based on programmable threshold(s). For example, the micro-vibrational sensor can be configured to sense (and thus the art tracker device 100 detect) air flow currents that are incident upon the artistic work 101 and vibrations of the art work (or frame holding the art work) that is indicative of fracturing (e.g., cracking) of the art work. In some implementations, for example, two or more art tracker devices 100 can be placed on the artistic work 101 in disparate locations such that the detected data by the micro-vibrational sensors of each art tracker device 100 can be used to generate a force or pressure gradient map on localized regions of the art work itself, e.g., which can illustrate how air flow currents from the proximate, immediate environment of the artistic work 101 or tensions applied from the setting of the art work in a frame, for example, are having a destructive effect on the art work.

In some embodiments of the sensor and/or actuator unit 111, the movement sensor can be configured to measure acceleration, velocity and positional changes of the art tracker device 100 (and hence the artistic work 101), using one or more accelerometers and/or one or more rate sensors (e.g., gyroscopes) configured as the movement sensor. In an example embodiment, the movement sensor includes an IMU (inertial movement unit), which monitors and determines specific force, linear and/or angular rate, linear and/or angular acceleration, and/or orientation of the art tracker device 100 in real time. For example, the movement sensor configured as an IMU an include one or more magnetometers, e.g., to provide a heading reference. In some embodiments, the movement sensor includes one accelerometer, rate sensor, and magnetometer in each of the x-, y-, and z-axes to determine pitch, roll and yaw movements of the art tracker device 100. In some embodiments, the movement sensor includes two or more accelerometers, rate sensors, and magnetometers in each of the x-, y-, and z-axes to determine pitch, roll and yaw movements of the art tracker device 100. Notably, the movement sensor can be integrated with a separate micro-vibrational sensor (e.g., share hardware), or operate as the micro-vibrational sensor (e.g., if the motion sensors are sufficiently sensitive to detect relatively lower magnitudes of motion, such as tenths of g). In some implementations, for example, the movement sensor can be configured to monitor and determine (e.g., and alert for) for movement fluctuations (e.g., changes of motion and/or orientations) based on first or second derivatives of the fluctuation (i.e., rate or acceleration of change) and/or magnitude of the fluctuation; and the art tracker device 100 can alert or allow movement fluctuations based on programmable threshold(s). In some implementations, for example, two or more art tracker devices 100 can be placed on the artistic work 101 in disparate locations such that the detected data by the movement sensors of each art tracker device 100 can be processed to utilize additional frame of references in determining movement of the art work.

In some embodiments of the sensor and/or actuator unit 111, the air quality sensor can be configured to detect certain particulates in the surrounding air and determine the presence of harmful materials or general air quality. In some embodiments, the air quality sensor can include a chemosensor that is configured to detect a specific chemical or class of chemicals when incident on the detection portion of the sensor. For example, the air quality sensor can employ an optical sensing mechanism that measures attenuation of IR (infrared) radiation (e.g., of a specific wavelength or range) in the proximate air, and comprising an IR emitter source, a light conduit (e.g., optical pipe), and IR detector and filter(s). In some implementations, for example, the air quality sensor can be configured to monitor and determine (e.g., and alert for) for fluctuations in the air quality (e.g., presence of more particulates) based on first or second derivatives of the fluctuation (i.e., rate or acceleration of change) and/or magnitude of the fluctuation; and the art tracker device 100 can alert or allow air quality fluctuations based on programmable threshold(s). In some implementations, for example, two or more art tracker devices 100 can be placed on the artistic work 101 in disparate locations such that the detected data by the air quality sensors of each art tracker device 100 can be used to generate a particulate distribution or gradient map on localized regions of the art work itself.

In some embodiments of the sensor and/or actuator unit 111, the optical sensor can be configured to detect light of certain spectra, intensity, and/or duration incident upon the art tracker device 100 (and hence the artistic work 101). In some embodiments, the optical sensor can be configured to determine UV and/or IR light and output a measured intensity in lumens. Such measurements can be processed to generate an alert when the UV and/or IR light exceeds a certain threshold, and/or to actuate the art tracker device 100 to respond to the light. In some implementations, for example, the optical sensor can be configured to monitor and determine (e.g., and alert for) for fluctuations in the incident light (e.g., including in select spectra, such as UV and/or IR) based on first or second derivatives of the fluctuation (i.e., rate or acceleration of change) and/or magnitude of the fluctuation; and the art tracker device 100 can alert or allow light fluctuations based on programmable threshold(s). In some implementations, for example, two or more art tracker devices 100 can be placed on the artistic work 101 in disparate locations such that the detected data by the optical sensors of each art tracker device 100 can be used to generate a light distribution or gradient map on localized regions of the art work itself, which can be used to determine directionality and source of the light on the artistic work 101.

In some implementations, the art tracker device 100 is configured to be in communication with one or more control systems in the facility that houses the artistic work 101 (e.g., museum, gallery, home, transit vehicle, storage unit, etc.). In such implementations, the art tracker device 100 (e.g., via the data processing and power management unit 113 and/or external processing device, such as in the cloud) can process the obtained data by the sensor and/or actuator unit 111 to determine attributes of detected stimuli and generate an intervention command (or series of intervention commands). For example, the intervention command generated by the data and power management unit 113 can be transmitted to a facility-based control system to cause the facility-based control system to change a setting on a facility environmental condition, such as, for example, modifying a shade associated with a window or skylight, modifying a climate control setting on an HVAC unit, modifying a motorized vent fin to alter the direction of air flows, etc. Also, for example, the intervention command(s) generated by the data and power management unit 113 may be transmitted in conjunction with the alerts that are generated. Moreover, the data and power management unit 113 can determine comparative data between the detected internal condition(s) and/or immediate external condition(s) on the artistic work 101 and the macroenvironment conditions set and monitored by the one or more control systems in the facility, with which the data and power management unit 113 is in communication.

As an illustrative example of the art tracker device 100 actuating a response to the monitored light or optical parameter deemed to be harmful (e.g., UV and/or IR light incident on the artistic work 101), the sensor and/or actuator unit 111 in conjunction with the data and power management unit 113 and/or the wireless communication unit 115 can generate certain controls to initiate a mitigation of the harmful optical stimuli. In some implementations, the data processing and power management unit 113 can process the obtained data by the sensor and/or actuator unit 111 to determine attributes of the detected harmful light exhibited on the artistic work 101, such as identifying an intensity of the light, a duration of time the harmful light is illuminated on the artistic work 101, and a direction/angle of the harmful light (e.g., calculated via changes in intensity over time), such that the art tracker device 100 can determine a source of the harmful light or optical stimuli on the artistic work 101. In turn, the data and power management unit 113 can generate one or more intervention commands (e.g., control signals) to cause an intervention to protect the artistic work 101. Such intervention command(s) can be transmitted by the wireless communication unit 115, to be received by a facility control system, to instruct the facility control system to change the setting on the shade over the determined source where the harmful light comes in, which can be for only the calculated durations where the harmful light illuminates the artistic work 101.

Data Processing and Power Management Unit(s)

The data and power management unit 113 of the art tracker device 100 is operable to receive and process data from the sensor and/or actuator unit 111 and produce health information about the artistic work 101, which can be provided to remote devices and/or utilized to actuate a "first response" directly upon the artistic work by the art tracker device 100 or upon an environmental condition by the art tracker device 100 sending a control signal to a remote device. In some implementations, the data and power management unit 113 is configured to receive raw or pre-processed signals provided by the various sensors of the sensor and/or actuator unit 111 and signal-process the raw or pre-processed signals, including amplifying, filtering, buffering, and/or multiplexing the signals for subsequent data processing (by a processor of the art tracker device 100 or remote device) and/or wireless communication (by the wireless communication unit 115 to a remote device). The data and power management unit 113 of the art tracker device 100 is also operable to manage power sourced from the power source 114 of the art tracker device 100. For example, the data and power management unit 113 can regulate power supplied from the power source 114 and/or power demanded by the other electronic components (e.g., the sensor and/or actuator unit 111 and the wireless communication unit 115).

The life of the power source 114 is important to implementations of the art tracker device 100, as it is undesirable to frequently change or charge batteries. Thus, the art tracker device 100 is configured to intelligently manage power distribution. For example, the data and power management unit 113 can regulate periodic data sample operations of the sensor and/or actuator unit 111, e.g., where sampling rates can be variable based on predetermined and/or adjustable settings, such as "More Sampling" vs "Longer Battery Life" states.

The data and power management unit 113 can be configured to include at least one processor coupled to at least one memory. Various types of processing units and memories may be utilized, with some examples discussed below (in reference to the art tracker device 100 and/or a remote device). In some implementations, the data and power management unit 113 can be divided into modular subunits, where power management is implemented by one subunit and data processing is implemented by another subunit. Whereas, in some implementations, both data processing and power management operations are performed by shared electronic components and resources.

Power Supply

The power source 114 of the art tracker device 100 can include a battery, a fuel cell, solar cell or other power storage unit. In some embodiments, the power source 114 can include a battery that can be recharging while "docked" or via solar cells with a long-life battery. One example includes a hybrid power supply unit, which includes a battery in communication with a solar cell, where both the battery and solar cell are electrically coupled via a solar sensor circuit that regulates the power demand from the battery and the charging of the battery by the solar cell. An example embodiment of the hybrid power supply unit is shown and discussed later in FIG. 1E.

Wireless Communication Unit

The wireless communication unit 115 of the art tracker device 100 can include one or more of a Bluetooth or BLE device, Wi-Fi device, Near Field Communication (NFC) device, and/or cellular communication device (e.g., 5G, LTE, 4G, 3G, or other). The wireless communication unit 115 can be controlled by the data and power management unit 113 to regulate the frequency and volume of data to be transmitted from the art tracker device 100 (e.g., caching and less frequent send/receive windows) to conserve power, and to regulate the periods of low or no electrical power to the wireless communication unit 115 to conserve power. For example, in some implementations, the wireless communication unit 115 can send data (provided via the data and power management unit 113) over the Internet, e.g., with direct MAC address via Wi-Fi, built-in wireless modem 3G/4G/LTE/5G, or Bluetooth with relay/repeater-type device/Hub. Also, for example, the wireless communication unit 115 can be configured to transmit an output signal from the art tracker device 100 that can be tied to a unique identifier for the art tracker device 100, and thereby the artistic work 101 being tracked. For example, the unique identifier can include a near field communication (NFC) tag and/or UHF RFID tag. Moreover, the monitored data associated with the artistic work (e.g., detected via the sensor and/or actuator unit 111) transmitted from the art tracker device 100, e.g., via the wireless communication unit 115, can be tied to a blockchain, which allows for another unique identifier (e.g., such as a non-fungible token (NFT)) for the artistic work 101 associated with its distinct properties and conditions.

In some implementations, for example, the wireless communications unit 113 includes or is embodied as a wireless transmitter/receiver (Tx/Rx) unit operable to transmit and/or receive data with another device via a wireless communication method, e.g., including, but not limited to, Bluetooth, Bluetooth low energy (BLE), Zigbee, IEEE 802.11, Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/5G/LTE cellular communication methods, and/or NFC (Near Field Communication).

Software

The art tracker device 100 can include embedded software, stored in whole or in part in the memory of the data and power management unit 113, which can control the data processing, power management, and data communications (e.g., transmission and/or reception) of the electronic units of the art tracker device 100. In some implementations, for example, the software on the art tracker device 100 can be updated, refreshed, or otherwise modified via communication between the art tracker device 100 and the remote data acquisition, storing and/or processing platform 102, e.g., facilitating download and upload of data, including raw or processed data sensed by the sensor and/or actuator unit 111 or system data for the art tracker device 100.

In some embodiments of the software, the art tracker device 100 includes a power source optimization module. The power source optimization software module includes code for displaying user-changeable settings associated with power management on a display device, and controls to cause the data and power management unit 113 to regulate the data sampling and/or power distribution accordingly. In some implementations, for example, the settings provided by the power source optimization software module can allow the user to choose among a "best power savings" mode and a "more data, more frequently" mode, which can be coupled with the smart adjustments listed below that can override certain preferences.

In some embodiments of the software, the art tracker device 100 includes a smart monitoring module. The smart monitoring software module includes code for decreasing sampling rates to extend battery life when no changes are occurring. For example, if the internal and environmental conditions are determined to be stable over a certain time period, then the smart monitoring software module can be implemented to cause the sensor and/or actuator unit 111 to sample less. Similarly, the smart monitoring software module includes code for increasing the sampling rates, such as when the art tracker device 100 determines that changes are detected. As an illustrative example, when the art tracking device 100 is conformed to a painting hanging in a museum, the smart monitoring software module can be set to sample data more frequently for the first weeks the painting is hung in a fixed location of the museum, and automatically modify the sampling rate to less frequently as a steady state set of internal and immediate external conditions are determined (e.g., determined to be safe to the painting); and if the art tracking device 100 determines that there is a change in an internal and immediate external condition of the painting, the smart monitoring software module can be set to sample data more frequently again.

In some embodiments of the software, the art tracker device 100 includes a smart communication and alert module. The smart communication and alert software module includes code for monitoring data in cache of the data processing unit and determining that data transmissions to a remote device should be reduced or temporarily halted, e.g., such as when nothing is changing, in order to optimize power supply life. For example, communications are typically the biggest battery drain for electronic devices, so less communication links can conserve battery life. Such implementations can save power supply 114 life by waiting longer to communicate and then sending more data when lines are up and open. Similarly, the smart communication and alert software module includes code for immediately enabling communications (e.g., implementing wireless transmissions) upon detected changes to the environment, e.g., via the cache monitoring, and sending the cached data immediately. In this manner, for example, the cached data can be processed remotely (i.e., off-board from) the art tracker device 100, thereby preserving power supply 114. Also, for example, the smart communication and alert software module includes code for generating device status alerts, e.g., based on a device status determined by the data and power management unit 113, such as for power supply 114 life, detected tampering of the artistic work 101, IP address changed, and other variables. In various implementations of the smart communication and alert software module, smart alerts can be adjusted, with the default frequency, thresholds, and variables being derived from an Index of art works (e.g., stored in a remote database at or in communication with the remote data and/or acquisition platform 102), as monitored by other art tracker devices 100 attached to other art works.

In some embodiments of the software, the art tracker device 100 includes a data layering module. The data layering software module includes code for integrating (layering) the internal and/or external condition data of the artistic work 101 detected by the art tracker device 100 with additional outside sources such as weather reports, political situation, emergency alerts, traffic monitoring alerts or reports, crime statistics, news reports, etc., e.g., to provide additional Smart Alerts and/or actuations of the art tracker device 100 on the artistic work 101.

In some embodiments of the software, the art tracker device 100 includes a data analysis module. The data analysis module includes code for calculating additional parameters associated with one or a plurality of the detected parameters directly detected by the sensors of the sensor and/or actuator unit 111. In some implementations, the data analysis module can interact with the data layering software module to pull information associated with outside sources, such as weather reports, seismic events, etc. The data analysis module can be programmed to determine a source of harmful effects sensed by the sensor and/or actuation unit 111, such as harmful optical stimuli (e.g., indirect UV light reflected from a reflective surface, and not directly upon the artistic work 101), harmful vibrational stimuli (e.g., mechanical forces caused by nearby cars, trains, or even human foot-traffic), harmful humidity stimuli (e.g., moist or dry air flows incident on the art work by vents in the facility or exhausts from vacuums or other portable machinery), and the like. For example, the data analysis module can include machine learning algorithms designed to process the detected sensor data, and based on models and external data like from the data layering software module, can produce intelligence about a hidden microenvironment of the artistic work 101 within the greater environment the artistic work 101 is being kept. As an example, the art tracker device 100 can monitor for the location data of the artistic work 101 to which it is attached, such that when the artistic work 101 is transported from one location to another, the data layering software module can receive traffic monitoring alerts or reports, and the data analysis module can determine in real time that a traffic accident on the shortest or fastest planned transit route will cause the artistic work 101 to undergo an additional amount of time in transit if the transit route is not rerouted to avoid the route with the traffic accident, and subsequently alert interested parties and/or plan an optimal transit rerouting.

In some embodiments of the software, the art tracker device 100 includes an actuation control software module. The actuation control software module can be in communication with the other modules of the art tracker device 100, e.g., the data analysis module, the data layering module, the smart communication and alert module, etc., as well as external data processing and storage sources, such as databases. The actuation control module includes code for generating commands (as control signals) provided to device components of the art tracker unit 100 or an external device, such as a control system of a facility housing the artistic work 101. For example, in some implementations, the data analysis module provides the analyzed data to the actuation control module, such as a located source of a harmful stimulus, and actuation control module generates an intervention command to actuate a change of setting to a facility unit under the direct control of the facility control system. As an example, the art tracker device 100 can monitor for air currents incident on the artistic work 101 to which the device 100 is attached, such that when air currents determined to meet or exceed a threshold, the actuation control software module can send a command to an external control system, e.g., such as an HVAC control system in the facility such as a museum, gallery, or home, to adjust a fan setting.

In some embodiments of the software, the art tracker device 100 includes a multi-mode identification module. The multi-mode identification software module includes code for tagging the health information to the specific artistic work 101, such as in an NFT associated with the specific art work, e.g., via dual- or multi-mode RFID that is married to the NFT in a blockchain. In this manner, for example, the dual-/multi-modal identification can provide security verification that all linked devices are together in direct proximity to the art work. For example, tampering detection and encryption data sets can be used to further verify that the known group (e.g., painting, tags, and sensors) is still intact and that no attempt has been made to falsify or manipulate the environmental data.

In some embodiments of the software, the art tracker device 100 includes a device status module. The device status software module includes code for providing status information on the art tracker device 100 itself, as opposed to the health of the artistic work 101. In some implementations, the device status module includes code for displaying text and graphical features indicative of the status of various components or functionalities of the art tracker device 100 on a display device, which can include on a display of a remote device such as a smartphone or computer. The device status software module can provide the status or identify, for example, the firmware version, the power supply life, an IP address associated with communication of the data, a mac address, a serial number or digital identification associated with the artistic work 101, or a tamper identification, or other feature of information.

Physical Configuration

The art tracker device 100 is structured to inconspicuously, unobtrusively, and noninvasively conform and attach to the artistic work 101 to which it is monitoring, analyzing, and responding, such that viewers of the artistic work 101 do not (easily or at all) see the art tracker device 100 while viewing the artistic work 101. In one aspect, the art tracker device 100 utilizes miniaturized electronic components that are designed in modular regions of the art tracker device 100, which allow for multi-dimensional attachment to the artistic object 101. For example, the art tracker 100 can include two, three or four (or more) modular regions 105 where certain functional electronic units of the device 100 are disposed; and some or each of these modular regions 105A, 105B, 105C, etc. can fold in multiple directions such that some or reach of the modular regions have varying orientations with respect to another, e.g., in which the folding is due to the nature of the substrate 110 and flexible electronic materials and design of the functional electronic units. In this manner, not only can the art tracker device 100 be positioned out of the normal view of the artistic work 101, but also can be configured to monitor the internal and immediate external factors of and on the artistic work 101 from different angles and locations.

As an example, the art tracker device 100 can be configured to have a light-monitoring unit disposed on a first modular region that folds away from its neighboring modular region(s), such that light-monitoring unit on the first modular region is positioned on an upward facing side of a painting's frame, while the remainder of modular region(s) of the art tracker device 100 are positioned on the back and/or a side of the frame of the painting. An example of this multi-dimensional modular configuration is shown later in FIG. 1D.

Figure 1B:
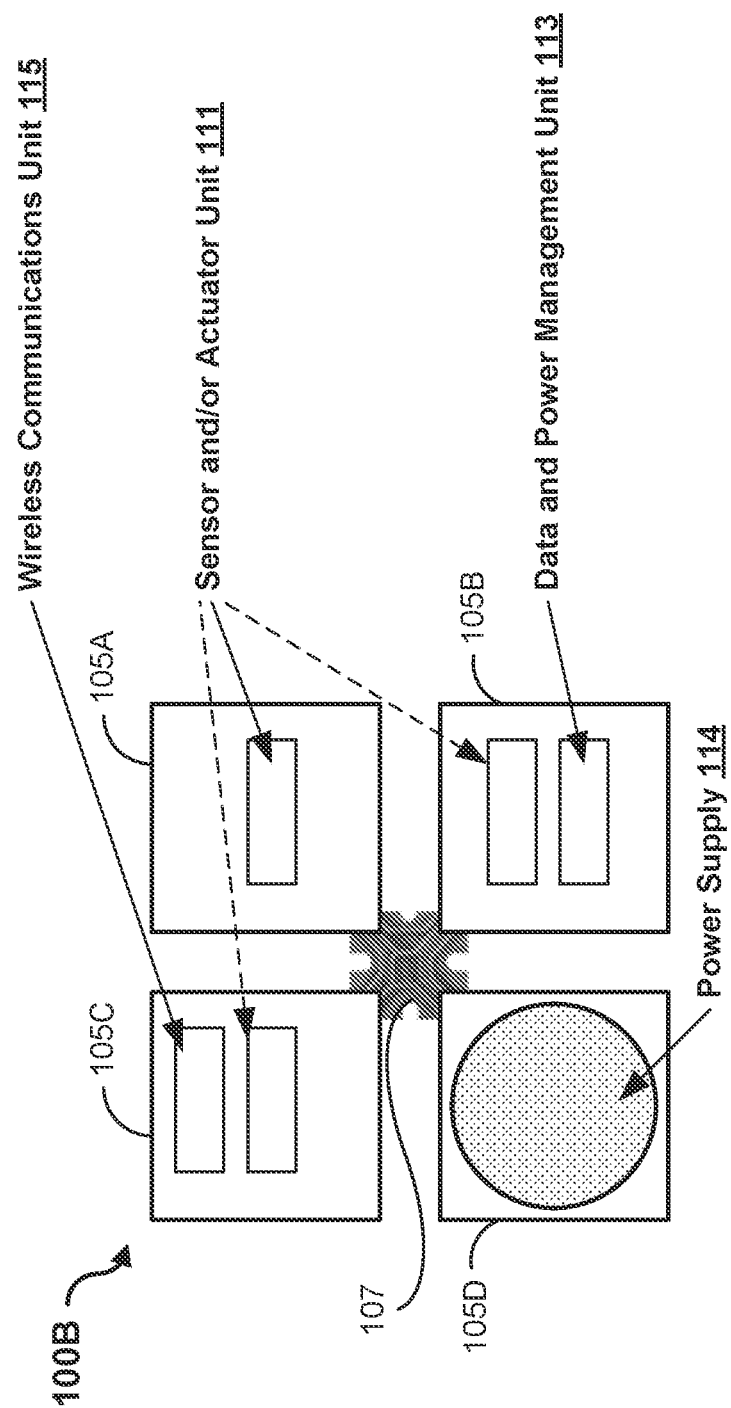
FIG. 1B shows a diagram depicting an example embodiment of the art tracker device shown in FIG. 1A, including multiple modular regions or segments to allow the art tracker device to conform to physical object, including an artistic work, in multiple dimensions.

FIG. 1B shows a schematic diagram of art tracker device 100B, which is an example embodiment of the art tracker device 100 shown in FIG. 1A. The art tracker device 100B includes the conformal substrate 110 supporting a plurality of modular regions 105 of device components on the substrate 110, in which the modular regions 105 are connected with each other via a flexible interconnection 107. In such embodiments, the flexible interconnection 107 can include flexible electronics, such as flexible electrically-conductive materials (which can optionally be disposed on a flexible electrically-insulating substrate material). In some example embodiments, the substrate 110 itself can be of a flexible, stretchable, and/or bendable electrically-insulative material; whereas in other example embodiments, the substrate 110 under some or each of the modular regions 105 can be of a rigid or quasi-flexible material, as the flexible interconnection 107 can allow the modular regions 105 to orient differently with respect to each other when attached to the artistic work 110; and thus, in either sets of embodiments, the art tracker device 100B is able to conform to the artistic work 101 in a variety of ways.

The example of the art tracker device 100B depicted in the diagram of FIG. 1B shows the device 100B comprises four modular regions: 105A, 105B, 105C and 105D, which correspond to example embodiments of the sensor and/or actuator unit 111, the data and power management unit 113, the wireless communications unit 115, and the power supply 114, respectively. In some example embodiments, the sensor and/or actuator unit 111 can include a temperature sensor, humidity sensor, gyroscope, accelerometer, micro-vibrational sensor, air quality sensor, optical sensor, and/or switches (e.g., standard electrical switch and/or a magnetic switch); the data and power management unit 113 includes a processing device, memory, and an input/output unit (I/O); and the wireless communications device 115 includes a BLE unit, Bluetooth, and/or NFC unit or other wireless communication unit. Also, in this example, the power supply 114 of the art tracker device 100B includes a battery. In some embodiments, as depicted by the broken line arrows in FIG. 1B, various sensor device components of the sensor and/or actuator unit 111 can be configured on other modular regions, e.g., such as modular region 105B and/or modular region 105C. As an example, an optical sensor can be configured on the modular region 105C that may be attached to a surface of the artistic work 101 that knowingly receives more light, while a movement sensor can be configured on modular region 105B and a micro-vibrational sensor can be configured on modular region 105A, which are oriented differently than the optical sensor on modular region 105C as attached to the artistic work 101. Moreover, in some embodiments, the size of the art tracker device 100B is configured to be relatively small, e.g., not much larger than a penny, occupying less than twice or thrice the surface area of a penny. In some embodiments, for example, at least some of the modular regions 105 can be configured to be reversibly attachable from the flexible interconnection 107 to allow interchanging of positions of the individual modular region(s) 105, e.g., allowing flexibility to accommodate various types of artwork and/or the placement of the artwork in a facility to optimize the monitoring of the internal and/or immediate external conditions while maintaining the inconspicuous, unobtrusive, and noninvasive nature for the monitoring application by the art tracker device 100B.

Figure 1C:
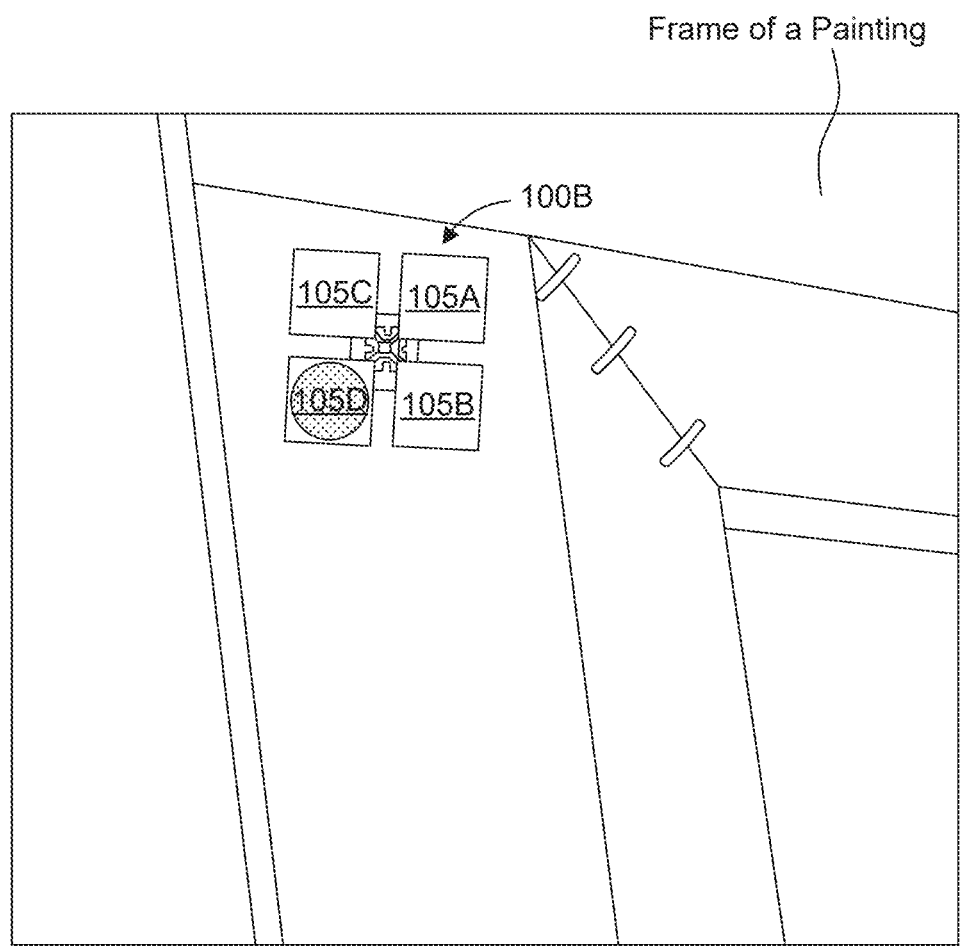
FIG. 1C shows an image of the example art tracker device shown in FIG. 1B during an example implementation of real-time monitoring and analysis of the internal conditions and external microenvironment of an artistic work.

FIG. 1C shows an image of the example art tracker device 100B shown in FIG. 1B during an example implementation of real-time monitoring and analysis of the internal conditions and external environment of an artistic work. In this example, the art tracker device 100B is configured on a single side of an artistic work 101, e.g., in a 2D conformation on the back-side of the frame of the painting. Notably, the art tracker device 100B can be conformed along multiple surfaces of different orientations, thus allowing the art tracker device 100B to conform to curved surfaces, perpendicular surfaces, or any non-uniform surfaces of the artistic work 101. While shown in this example as attached to the frame of the artistic work 101, one or more of the modular regions 105 or the entire art tracker device 100 can be attached directly to the painting, e.g., such as on the back of the canvas. As an example, one modular region of the art tracker device 100 that includes one or more sensors, such as a micro-vibrational sensor, can be attached to the painting while the other modular region(s) of the device 100 can be attached to the painting's frame (in varying orientations) to optimize detection of the target internal and/or immediate external conditions.

Figure 1D:
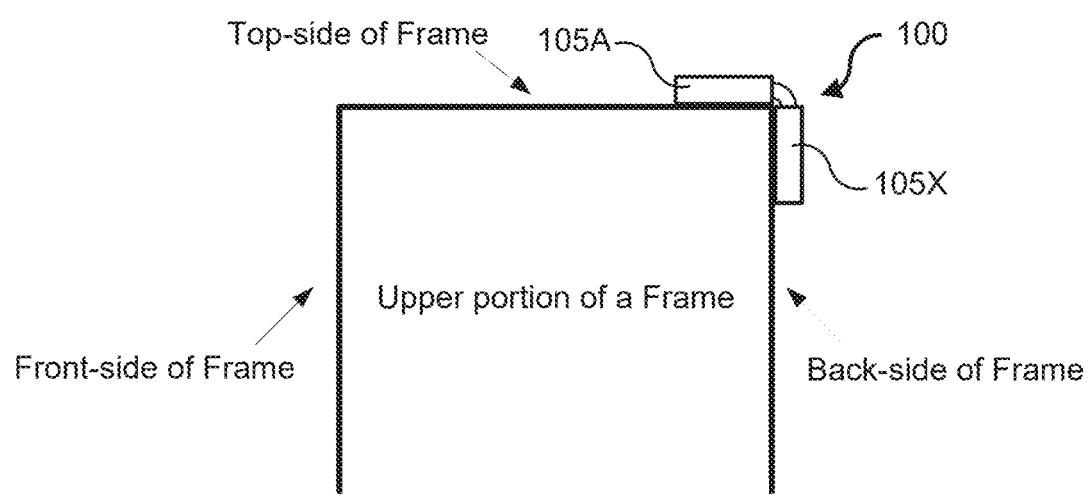
FIG. 1D shows a diagram illustrating an example configuration of multiple modular regions or segments positioned on different sides of a painting frame for an example embodiment of the art tracker device of FIG. 1B.

FIG. 1D shows a diagram illustrating an example configuration of a light-monitoring unit disposed on a first modular region (illustrated as modular region 105A) of an example art tracker device 100 disposed on a top surface of a frame, and where data and power processing of the art tracker device 100 are disposed on other modular region(s) (such as modular region 105X shown to be attached to a back-side surface of the frame). As such, the art tracker 100 can be inconspicuously secured to the artistic work 101, not only due to the small footprint and conformability of the substrate 110, but also based on its multi-dimensional coverage on the artistic work 101.

Figure 1E:
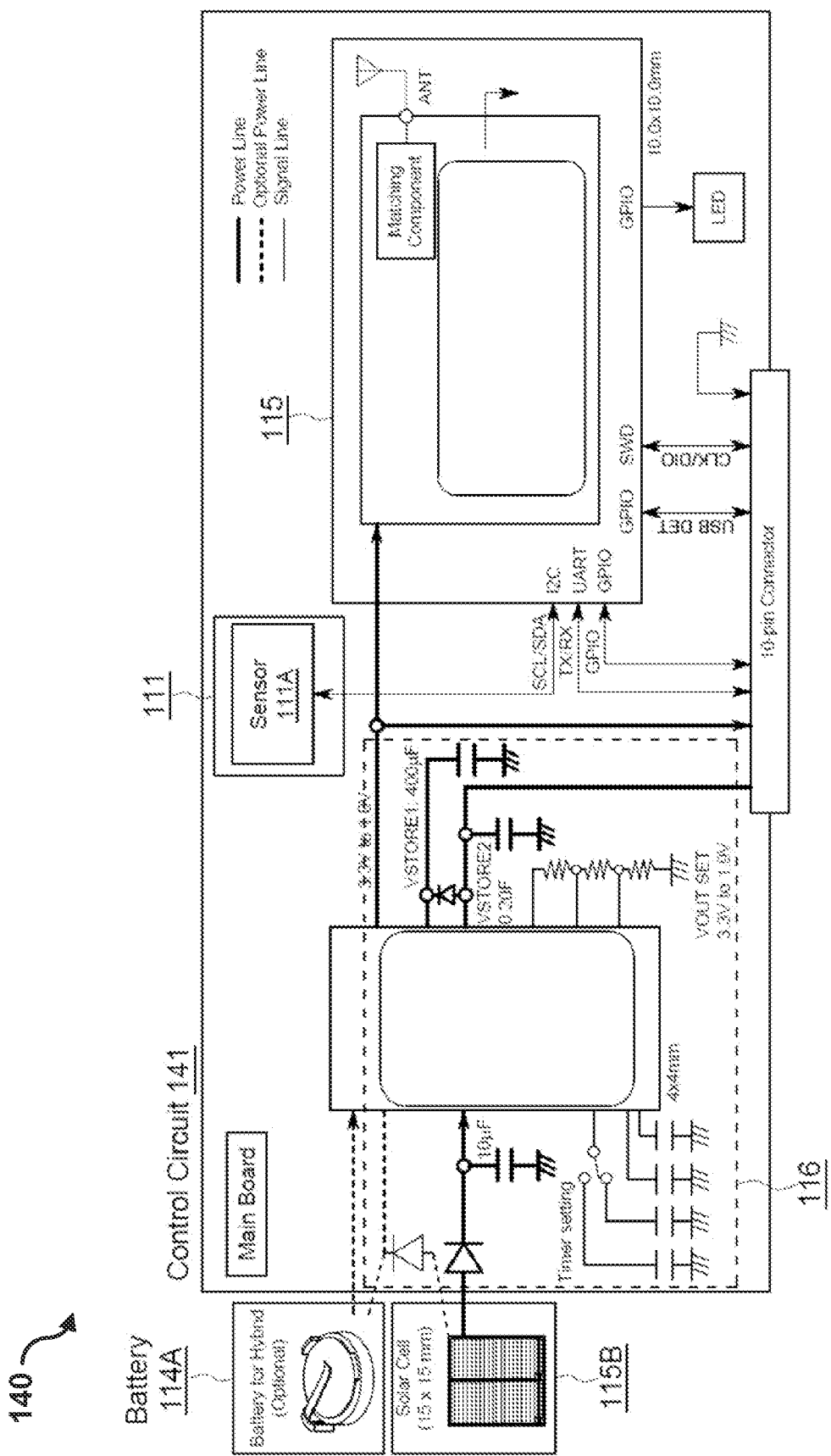
FIGS. 1E and 1F show diagrams illustrating example embodiments of a hybrid power supply unit for regulating power in an art tracker device in accordance with the present technology.

FIG. 1E shows a diagram illustrating an example embodiment of a hybrid power supply unit 140 for regulating power in example embodiments of the art tracker device 100. The hybrid power supply unit 140 includes a power storage device 114A, e.g., such as a battery, and a power generation device 115B, e.g., such as a solar cell or a fuel cell, which are both in electrical communication with a control circuit 141. In some embodiments, for example, the power supply 114 can include an input to receive external power from an external power source. The control circuit 141 can include and/or be interfaced with hardware and software modules of the data and power management unit 113, the sensor and/or actuator unit 111, and/or the wireless communication unit 115. In the example shown in FIG. 1E, the control circuit 141 interfaces with an example sensor 111A (e.g., temperature sensor, humidity sensor, air quality sensor, and/or other sensor embodiment or combination thereof) of the sensor and/or actuator unit 111. Also, in the example shown in FIG. 1E, the control circuit 141 interfaces with an example BLE unit of the wireless communication unit 115. Further, in the example shown in FIG. 1E, the power storage device is a battery (e.g., CR2430 3V lithium coin battery), and the power generation device 115B is a solar cell (e.g., 15 mm×15 mm size); and as such, the control circuit 141 in the example shown in FIG. 1E is operable as a solar BLE sensor control circuit.

In some implementations of the hybrid power supply unit 140, for example, electrical energy extracted from light via the power generation device 115B (e.g., solar cell) can be regulated for recharging the power storage device 114A (e.g., chargeable battery) based on a switching unit controlled by the control circuit 141. Whereas, in some implementations, the hybrid power supply unit 140 can include an intermediate energy storage unit 116 (e.g., capacitor(s) and switching unit) that is controlled by the control circuit 141 to receive and store electrical charge extracted by the power generation unit 115B (e.g., solar cell) and be used to draw electrical energy by the device components of the art tracker device 100 (e.g., sensor and/or actuator unit 111, data and power management unit 113, and/or wireless communication unit 115) in order to preserve electrical energy supplied by the power storage device 114A. For example, for some artistic works, there is a relatively low amount of light (e.g., low lumens) exposed upon the artistic work (and thereby, the power supply unit 114 of the art tracker device) to sufficiently re-charge the power storage unit 114A in an optimal manner; and thus the hybrid power supply unit 140 can regulate the intermediate energy storage unit 116 to collect an ample amount of electrical energy and switch to the intermediate energy storage unit 116 to subsequently supply electrical power to the device components, thereby switching the power supply unit 140 in an 'off' state to preserve its energy supply.

Figure 1F:
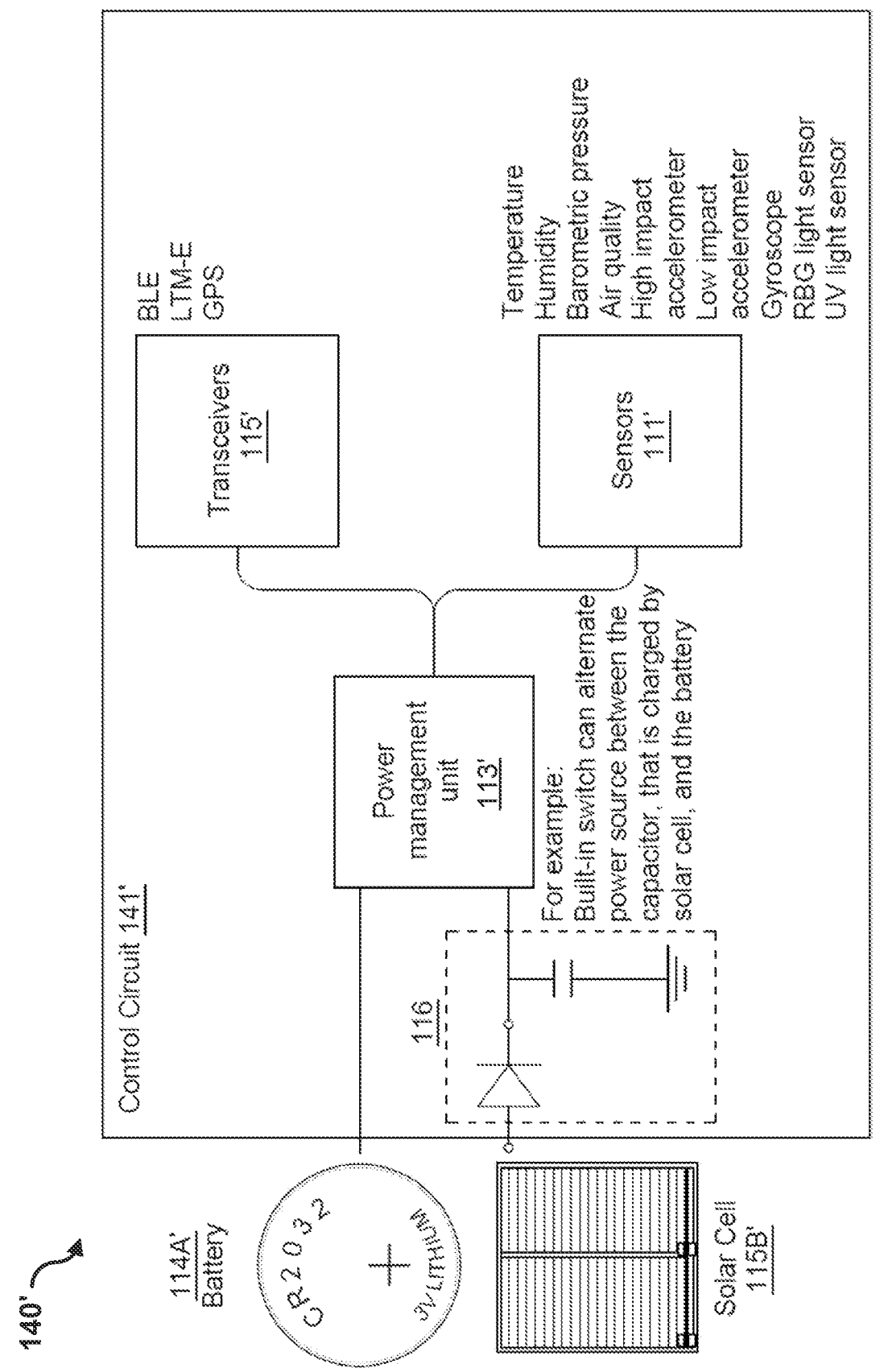

FIG. 1F shows another diagram illustrating an example embodiment of the hybrid power supply unit, shown as hybrid power supply unit 140' in FIG. 1F, for regulating power in example embodiments of the art tracker device 100. The hybrid power supply unit 140' includes a battery 114A' electrically coupled to a control circuit 141', and a solar cell (e.g., array of solar cells) 114B' electrically coupled to the intermediate energy storage unit 116 (e.g., via a switch to a capacitor (e.g., super capacitor) capable of storing electrical energy), which is electrically coupled to the control circuit 141'. In implementations of the hybrid power supply unit 140', for example, the intermediate energy storage unit 116 can be a built-in switch that can alternate between the drawing power from the battery 114A' and supplying electrical energy to charge the battery 114A' by the solar cell 115B'. As shown in this example, the control circuit 141' is integrated with hardware and software modules of the data and power management unit 113, the sensor and/or actuator unit 111, and/or the wireless communication unit 115, shown in FIG. 1F as data and power management unit 113', the sensor(s) 111', and transceiver(s) 115'. Example wireless communication devices including but not limited to BLE, LTE-E, and GPS can be included in the transceiver(s) 115' of the example control circuit 141'. The sensor(s) 111' of the example control circuit 141' can include, but is not limited to, a temperature sensor, a humidity sensor, a barometric pressure sensor, an air quality sensor (e.g., particulate detector), a high impact accelerometer, a low impact accelerometer, gyroscope, RGB light sensor, and/or a UV light sensor.

Referring back to FIG. 1A, in some implementations, the art tracker device 100 is in wireless communication with the remote data acquisition, storing and/or processing platform 102 (also referred to herein as the remote data platform 102) configured to obtain the internal and external condition information about the artistic work 101 detected and/or pre-processed by the art tracker 100. For example, the remote data platform 102 can include one or more computing devices and be in communication with other one or more computing devices (over a network, such as the cloud) that perform additional analysis and/or update a database on the artistic work 101 on the artistic work's health. For example, the health information can be stored in the database along with other information about the artistic work 101, such as the artistic work's provenance, history (including ownership, handling, modifications, restorations, etc.), legal documentation, or other. For example, the remote data platform 102 can be configured to access third party databases and resources and collect large amounts of information known related to the artistic work 101, such as information about other paintings and artists.

In some example embodiments, the remote data platform 102 is embodied as a computing device such as a computer (e.g., server, desktop, or laptop) or smart device (e.g., smartphone, tablet, or wearable computing device) that includes a processor to process the data, a memory in communication with the processor to store data, and an input/output unit (I/O) to interface the processor and/or memory to other modules, units or devices, and/or external devices. In some example embodiments, the remote data platform 102 is embodied as an intermediary data router (e.g., hub), which can route data traffic between the art tracker device 100 and other external devices, such as other computing devices like local computers, servers, mobile devices, etc. that may also constitute devices of the remote data platform 102.

In various embodiments, for example, the processor of the remote data platform 102 (or, the processor of the data and power management unit 113) can include a central processing unit (CPU), a graphics processing unit (GPU), and/or a microcontroller unit (MCU), and/or other processing unit. For example, the memory of the remote data platform 102 (or, the memory of the data and power management unit 113) can include and store processor-executable code, which when executed by the processor, configures the processor of the remote data platform 102 (or, alternatively or additionally, the art tracker device 100) to perform various operations, e.g., such as acquiring or generating information, commands, and/or data, processing information, commands, and/or data, and transmitting or providing information, commands, and/or data to another device.

To support various functions of the remote data platform 102 (or, the art tracker device 100), the memory can store information and data, such as instructions, software, values, images, and other data processed or referenced by the processor. For example, various types of Random Access Memory (RAM) devices, Read Only Memory (ROM) devices, Flash Memory devices, and/or other suitable storage media can be used to implement storage functions of the memory.

The I/O can interface the remote data platform 102 with a wireless communications device (e.g., including, the art tracker device 100) and/or a wired communication device to utilize various types of wireless or wired interfaces compatible with typical data communication standards. The I/O of the remote data platform 102 can also interface with other external interfaces, sources of data storage, and/or visual or audio display devices, etc. to retrieve and transfer data and information that can be processed by the processor, stored in the memory, or exhibited on an output device or other external device. For example, an output device such as a display unit can be configured to be in data communication with the remote data platform 102. e.g., via the I/O, to provide a visual display, an audio display, and/or other sensory display that produces a user interface of a software application ("app") in accordance with the art health tracking techniques of the disclosed technology. In some examples, the display unit can include various types of screen displays, speakers, or printing interfaces, e.g., including but not limited to: various types of light emitting diode (LED) or liquid crystal display (LCD) monitors or screens, cathode ray tube (CRT), and/or hologram as a visual display; audio signal transducer apparatuses as an audio display; and/or toner, liquid inkjet, solid ink, dye sublimation, inkless (e.g., such as thermal or UV) printing apparatuses, etc. Similarly, as described above, the remote data platform 102 can include a smartphone, tablet or other hand-held device that provides the app to which the art work's health information, tracked by the art tracker device 100, can be viewed, controlled, or otherwise utilized.

Figure 2A:
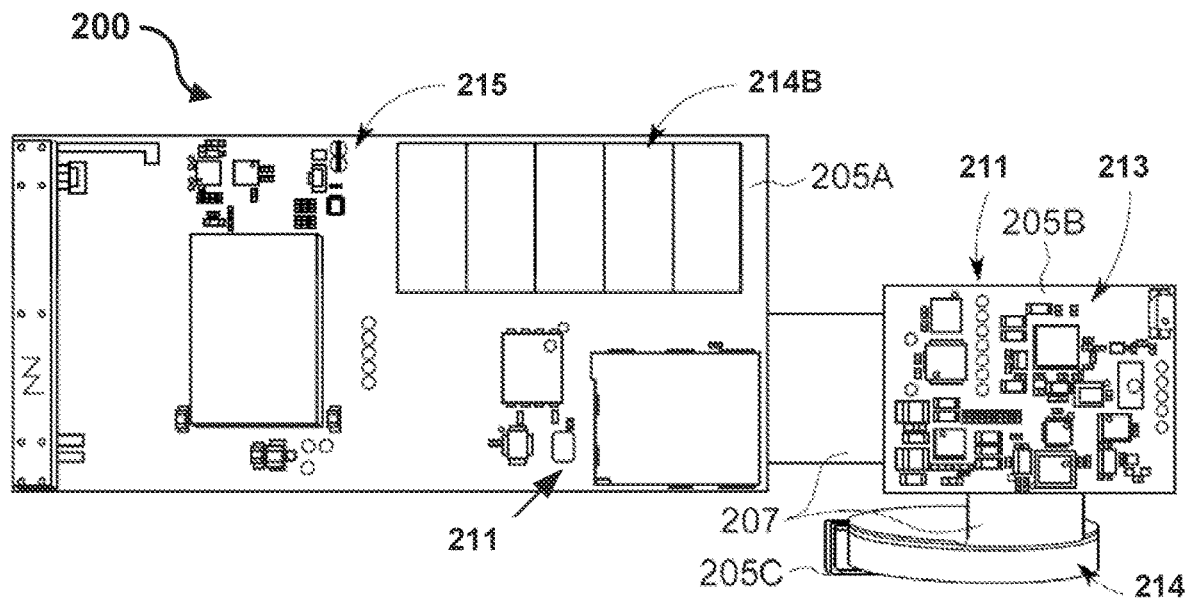
FIG. 2A shows a diagram depicting an example embodiment of the art tracker device shown in FIG. 1A.
Figure 2B:
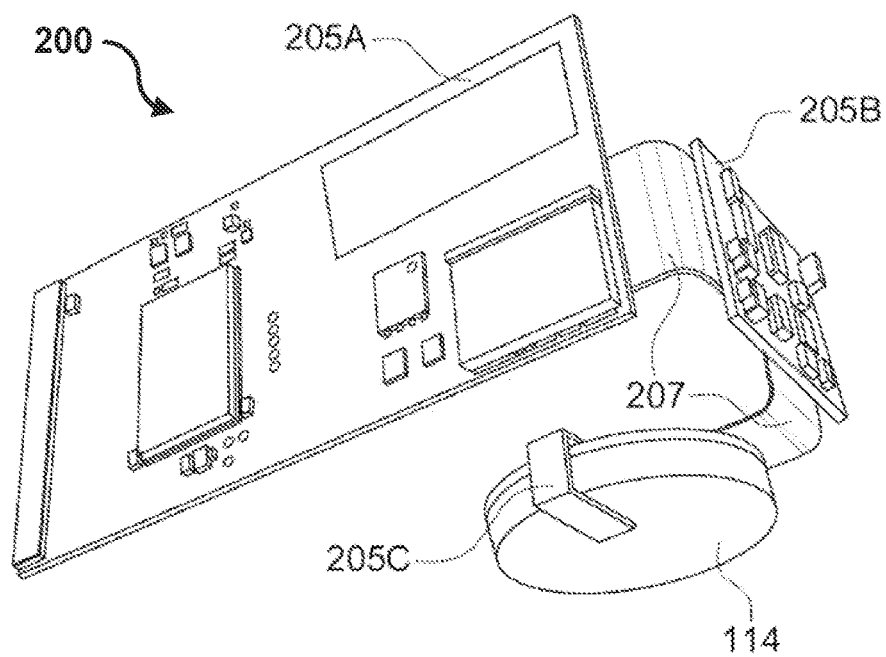
FIG. 2B shows a diagram illustrating an example configuration the multiple modular regions or segments that can be folded to allow the art tracker device shown in FIG. 2A to attach to different sides of an artistic work.

FIGS. 2A and 2B show diagrams depicting an example embodiment of the art tracker device 100, shown as art tracker device 200, which can fold in multiple dimensions to attach to multiple surfaces or a non-uniform surface of an artistic work. The art tracker device 200 includes three modular regions 205A, 205B, and 205C, interconnected via one or more flexible interconnections 207, which allow the art tracker device 200 to conform to different surfaces of the artistic work 101 along different orientations. In this example, example embodiments of the sensor (and/or actuator) unit 111, the data and power management unit 113, and the wireless communications unit 115 can be configured on a single region or multiple modular regions of the art tracker device 200, such as modular regions 205A and 205B as in FIG. 2A; and an example embodiment of the power supply 114 is configured on the modular region 205C of the art tracker device 200.

Figure 2C:
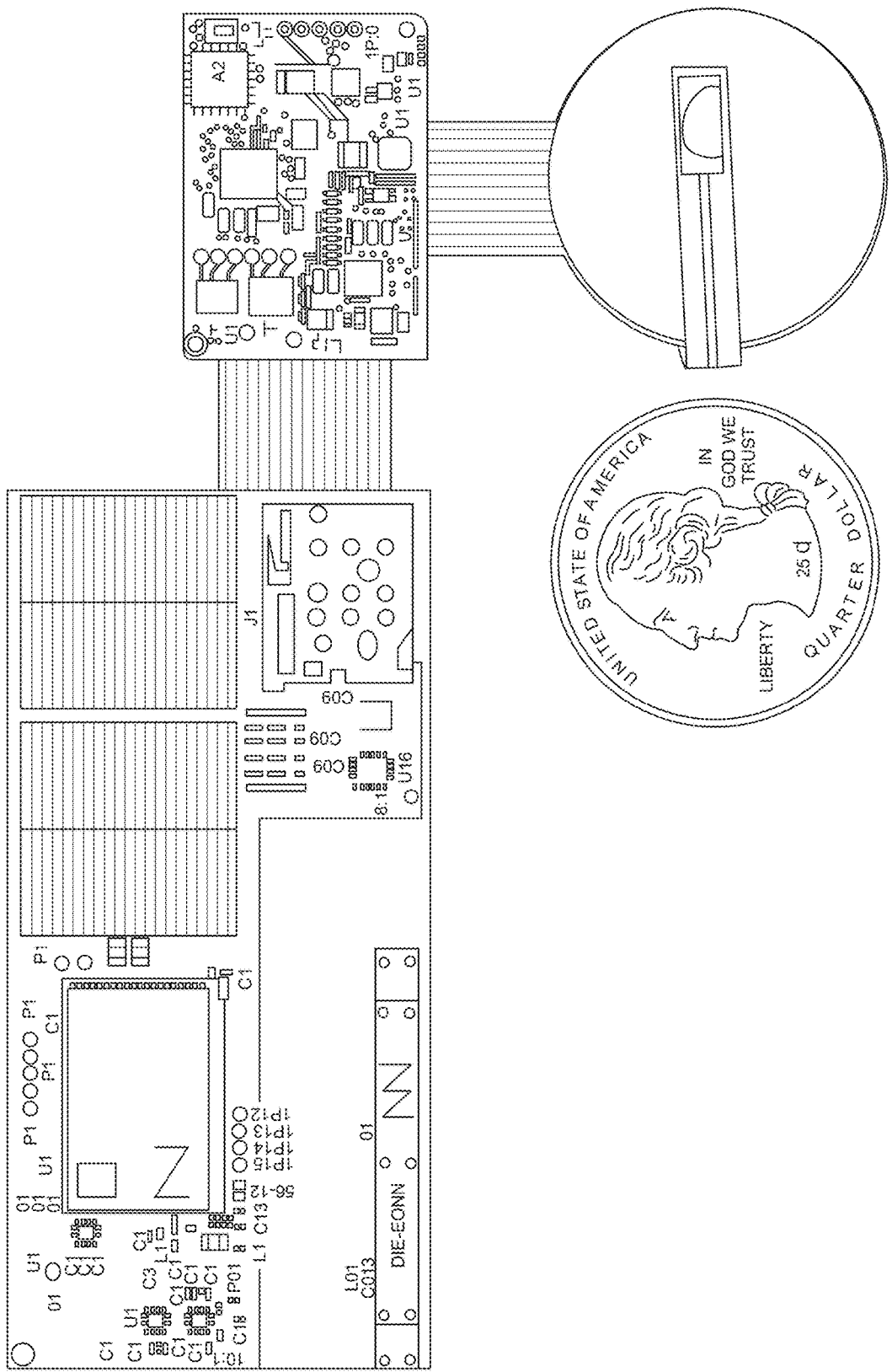
FIGS. 2C-2E shows images of the example embodiment of the art tracker device shown in FIGS. 2A and 2B.

For the example of the art tracker device 200 shown in FIGS. 2A-2C, the modular region 205A includes an example embodiment of the wireless communication unit 115, labeled as wireless communication unit 215, which includes one or more radio transceiver (e.g., cellular, such as LTM-E or 5G) and geolocalization capabilities (GPS), one or more antennas, and a Nano SIM port). Also, in this example, the modular region 205A can include an array of solar cells 214B, and can include one or more sensors of the example embodiment of the sensor and/or actuator unit 111 on the art tracker device 200, labeled as sensor and/or actuator unit 211. In the example shown in FIG. 2A, the sensor and/or actuator unit 211 includes an optical sensor (e.g., RGB light sensor and/or UV light sensor) disposed on the modular region 205A, e.g., which can be intended to be positioned on the art work to receive the greatest possible light exposure on the art tracker device 200 when implemented on the art work. In this example, the modular region 205B includes several other device components of the sensor and/or actuator unit 211, e.g., including an environment sensing unit comprising a temperature sensor, humidity sensor, barometric pressure sensor, and an air quality measurement sensor. The sensor and/or actuator unit 211 configuration on the modular region 205B also includes a high-impact accelerometer and a low-impact accelerometer, with a gyroscope, and can include an additional optical sensor (e.g., RGB light sensor and/or UV light sensor). The modular region 205B also includes the example embodiment of the data and power management unit 113 of the art tracker device 200, labeled as data and power management unit 213, which includes a processing device, memory, and/or I/O. In some embodiments of the modular region 205B, additional device components of the wireless communications unit 215 are employed on the modular region 205B, e.g., including one or more antennas and additional radio transceivers (e.g., BLE unit). In the example of FIGS. 2A and 2B, the example embodiment of the power supply 114 of the art tracker device 200, labeled as power supply 214, includes a coin cell battery, such as a watch battery, which is configured in the modular region 205C.

The diagram of FIG. 2B illustrates an example configuration the multiple modular regions that are folded to allow the art tracker device 200 to attach to different sides of an artistic work. In this example, the modular regions 205A, 205B and 205C are each configured to be perpendicular to one another.

FIG. 2C shows an image of the example embodiment of the art tracker device 200 shown in FIGS. 2A and 2B. In this image, the example art tracker device 200 is configured in a flattened position, which can inconspicuously conform to a two-dimensional surface.

Figure 2D:
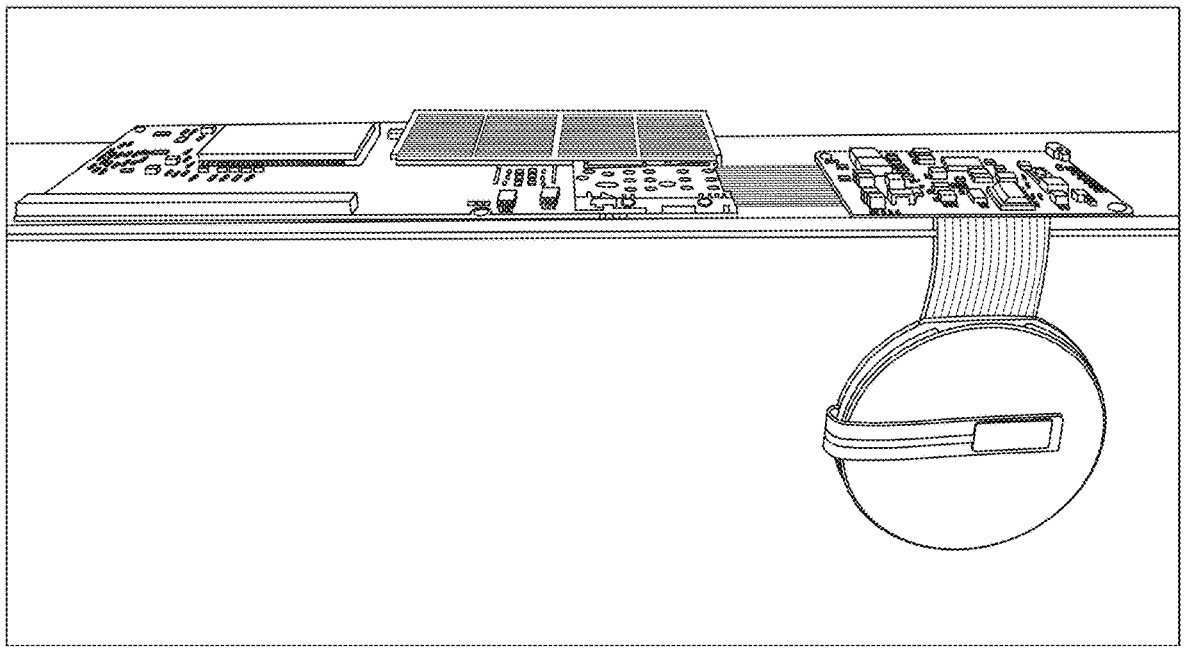

FIG. 2D shows another image of the example embodiment of the art tracker device 200 shown in FIGS. 2A and 2B. In this image, the modular regions 205A and 205B of the example art tracker device 200 are configured in a flattened position on the top surface of a painting's frame, with the power supply 214 of the modular region 205C positioned perpendicular to the modular regions 205A and 205C along a back side of the frame.

Figure 2E:
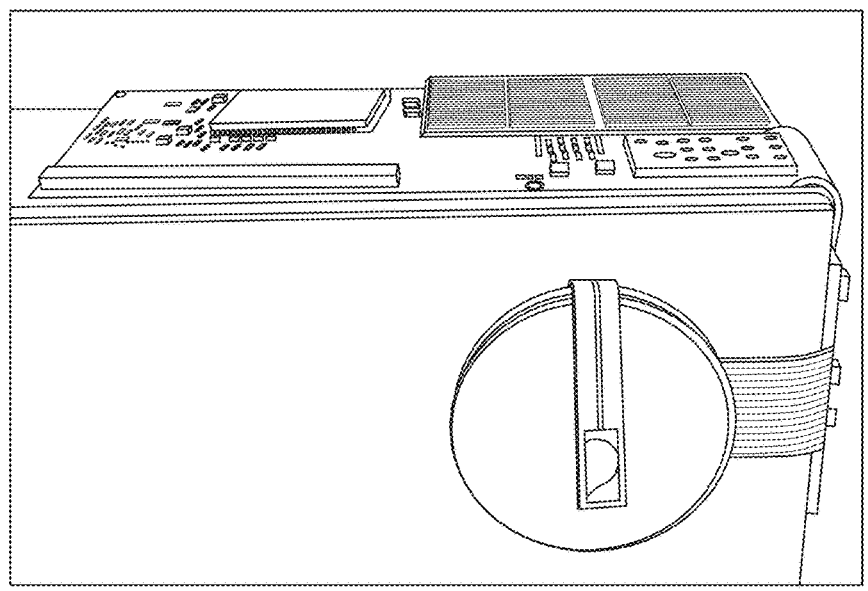

FIG. 2E shows another image of the example embodiment of the art tracker device shown in FIGS. 2A and 2B. In this image, the modular regions 205A, 205B, and 205C of the example art tracker device 200 are configured perpendicular to one another on the top surface of the painting's frame, a side of the frame, and the back side of the frame, respectively.

In some embodiments of the art tracker device 200, the device specifications can include the following (in Tables 1-5, below).

Table 1: Hardware dimensions of an example Art Tracker Device 200.

TABLE 1

| Width | 30 mm |
|---|---|
| Height | 35 mm |
| Thickness | 10 μm |

Table 2: Wireless data communication parameters (e.g. using Bluetooth 5.0) of an example Art Tracker Device 200.

TABLE 2

| Data transfer | Up to 2 Mbps |
|---|---|
| Range | Up to 240 Meters |
| Frequency | 2.4 and 2.48 GHz |
| | 2.4 and 2.485 GHz |
| Guard Band | 2 MHz wide at the bottom |
| | 3.5 MHz wide at the top |

Table 3: GPS parameters of an example Art Tracker Device 200.

TABLE 3

| Operating Voltage | 3.3 V supply voltage. 50 mA peak current. |
|---|---|
| Acquisition Time | Hot Start TTFF @ −136 dBm: 0.6 sec |
| Output | UART input/output/Bluetooth |
| Accuracy | Standard INS/GPS of 1.5 to 2 meters |

Table 4: IMU parameters of an example Art Tracker Device 200.

TABLE 4

| Range | selectable range |
|---|---|
| Accelerometer | ±2 g to ±16 g |
| Gyroscope | ±125 to ±2000°/S |
| Digital resolution | 16 bit |
| Sample rate | 0.001-100 Hz |

Table 5: Humidly and Temperature Sensor parameters of an example Art Tracker Device 200.

TABLE 5

| Relative humidity range | 0% to 100% |
|---|---|
| Humidity accuracy | ±2% (typical) |
| Temperature accuracy | ±0.2° C. (typical) |
| Temperature Range | −40° C.-85° C. |
| Digital resolution | 14 bit |
| Sample rate | 0.001 Hz-50 Hz |

Figure 3A:
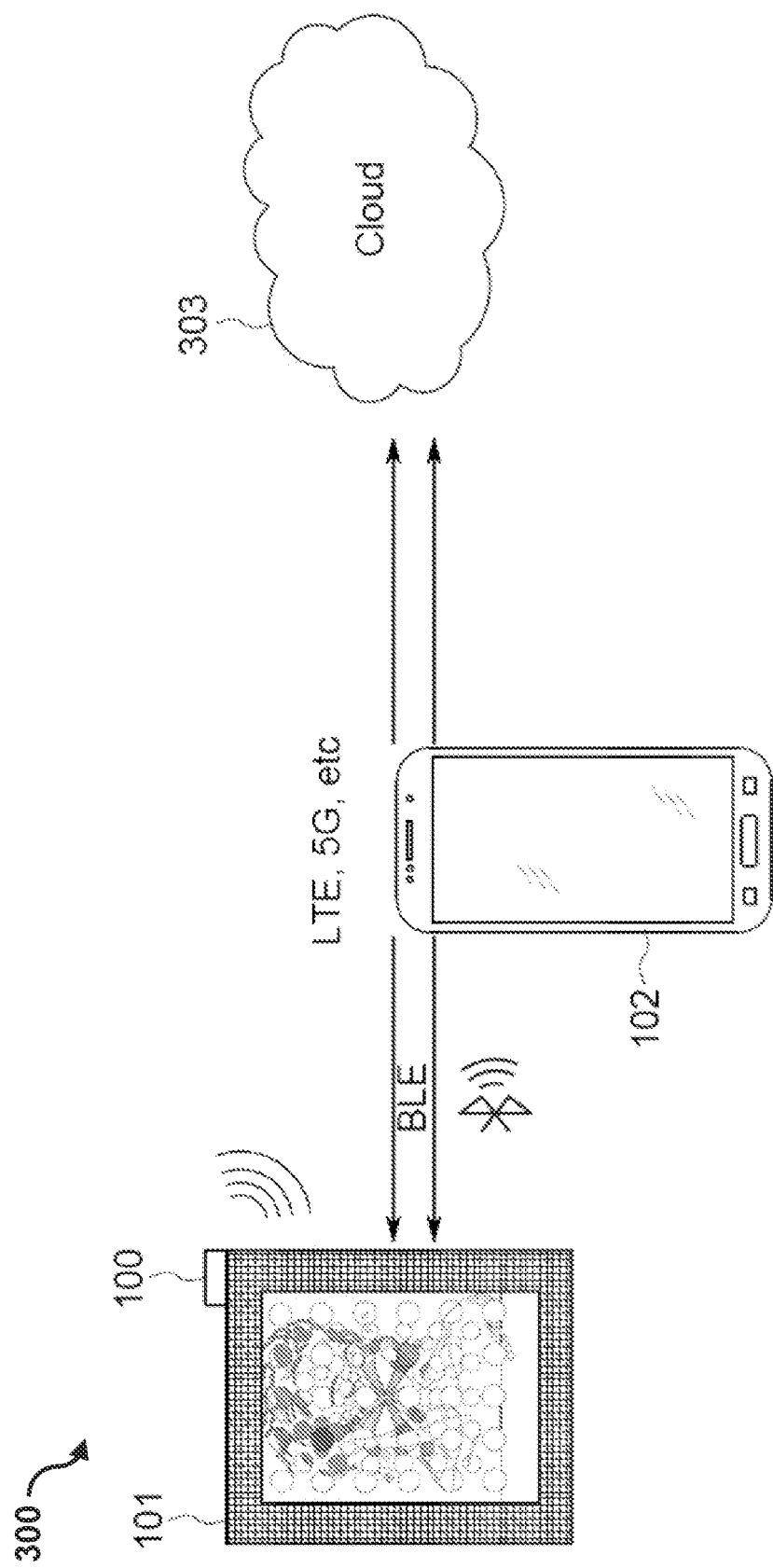
FIG. 3A shows an illustrative diagram of an example embodiment of a system for real-time, remote and quantitative monitoring of internal and external conditions of an artistic work by an art tracker device in accordance with the present technology.

FIG. 3A shows an illustrative diagram of an example embodiment of a system 300 providing a communication environment for real-time, remote and quantitative monitoring of internal and external conditions of artistic work 101 by example embodiments of the art tracker device 100. As shown in the diagram, the system 300 can include the art tracker device 100 monitoring the artistic work 101, the remote data acquisition, storing and/or processing platform 102 (embodied as a smartphone, in this example), and one or more computing devices 303 (e.g., where the computing devices 303 are networked, such as in the cloud or a neural network), where data and controls are wirelessly communicated between the art tracker device 100, the remote data acquisition, storing and/or processing platform 102, and the cloud 303. In some implementations, for example, the system 300 can utilize an Internet of Things (IoT) communication protocol, including but not limited to MQTT, which can enable multiple art tracker devices 100 to communicate with one or more remote data acquisition, storing and/or processing platforms 102 using an ordered, lossless, bi-direction communication scheme.

Figure 3B:
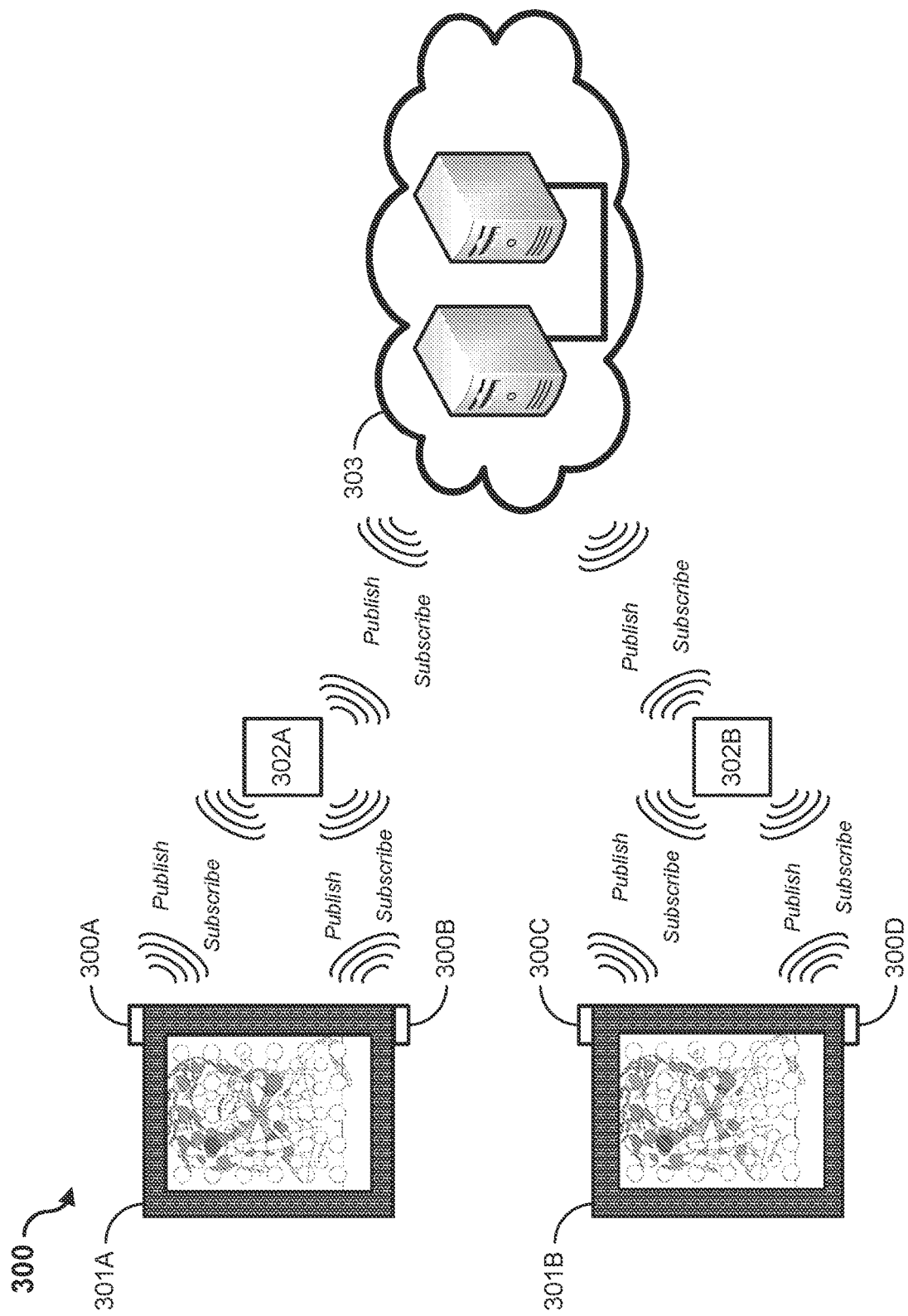
FIG. 3B shows an illustrative diagram depicting an example data communication scheme for the system shown in FIG. 3A.

FIG. 3B shows an illustrative diagram depicting an example MQTT data brokerage scheme for the system 300. In this example of the system 300, two example artistic works 301A and 301B are each being monitored by a plurality of art tracker devices, i.e., devices 300A and 300B monitoring artistic work 301A, and devices 300C and 300D monitoring artistic work 301B. The plurality of art tracker devices 300A, 300B and the art tracker devices 300C and 300D are in communication with broker or server devices 302A and 302B, respectively, which are in communication with computers in the cloud 303. Broker or server devices 302A and 302B are example embodiments of the remote data device 102; and art tracker devices 300A, 300B, 300C and 300D are example embodiments of any of the embodiments of the art tracker device 100. Utilizing an MQTT data brokerage scheme, the system 300 is able to provide data between all the devices using IoT based publishing and subscribing techniques.

Figure 4:
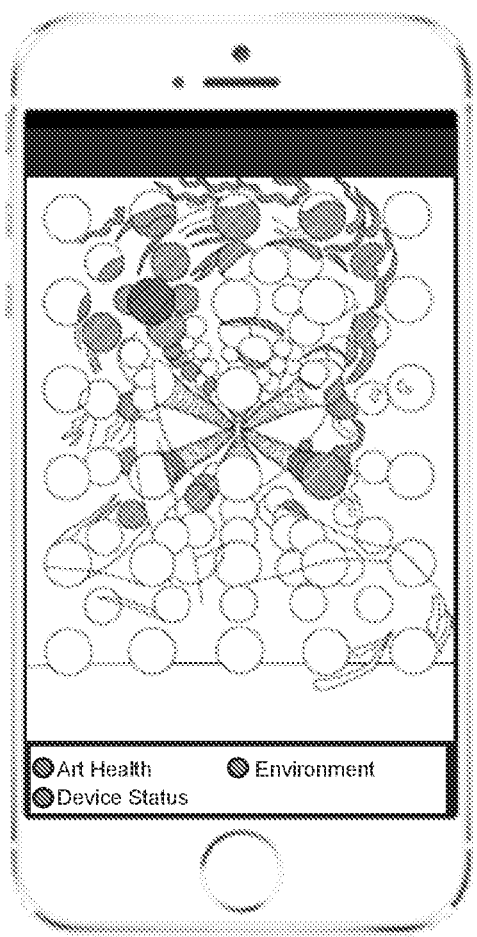
FIG. 4 shows an illustrative diagram of a computing device presenting a user interface for a software application to display data and settings associated with the functionalities of example embodiments of the disclosed art tracker device.

FIG. 4 shows an illustrative diagram of a computing device (illustrated as an example smartphone device in the diagram) presenting a user interface of a software application (app), resident on the example computing device, that can be utilized in displaying data provided by any of the embodiments of the art tracker device 100. In some implementations, the computing device is an embodiment of the remote data device 102 of FIG. 1A. In various implementations, the example computing device can embody at least some of the processing modules of the data processing unit of the art tracker device 100. As shown in the diagram, the app displays a user interface that can feature information associated with the health and/or status of the monitored artistic work 101, as well as the status of the art tracker 100 attached to the artistic work 101. For example, the app can display an image depicting the artistic work specifically associated with the art tracker 100. In this example, the app can also display a user input box that allows the user to display other information associated with the analyzed data and/or to modify a setting of the art tracker device 100, as discussed above. In some implementations, the app can also include zoom functionality and focusing features to view the health data (e.g., which can be superimposed over an image of the art work), including zoom functionality at certain locations with high resolution. In some implementations, the app provides data entry functionality to add notes or other data associated with the artistic work 101.

Figure 5:
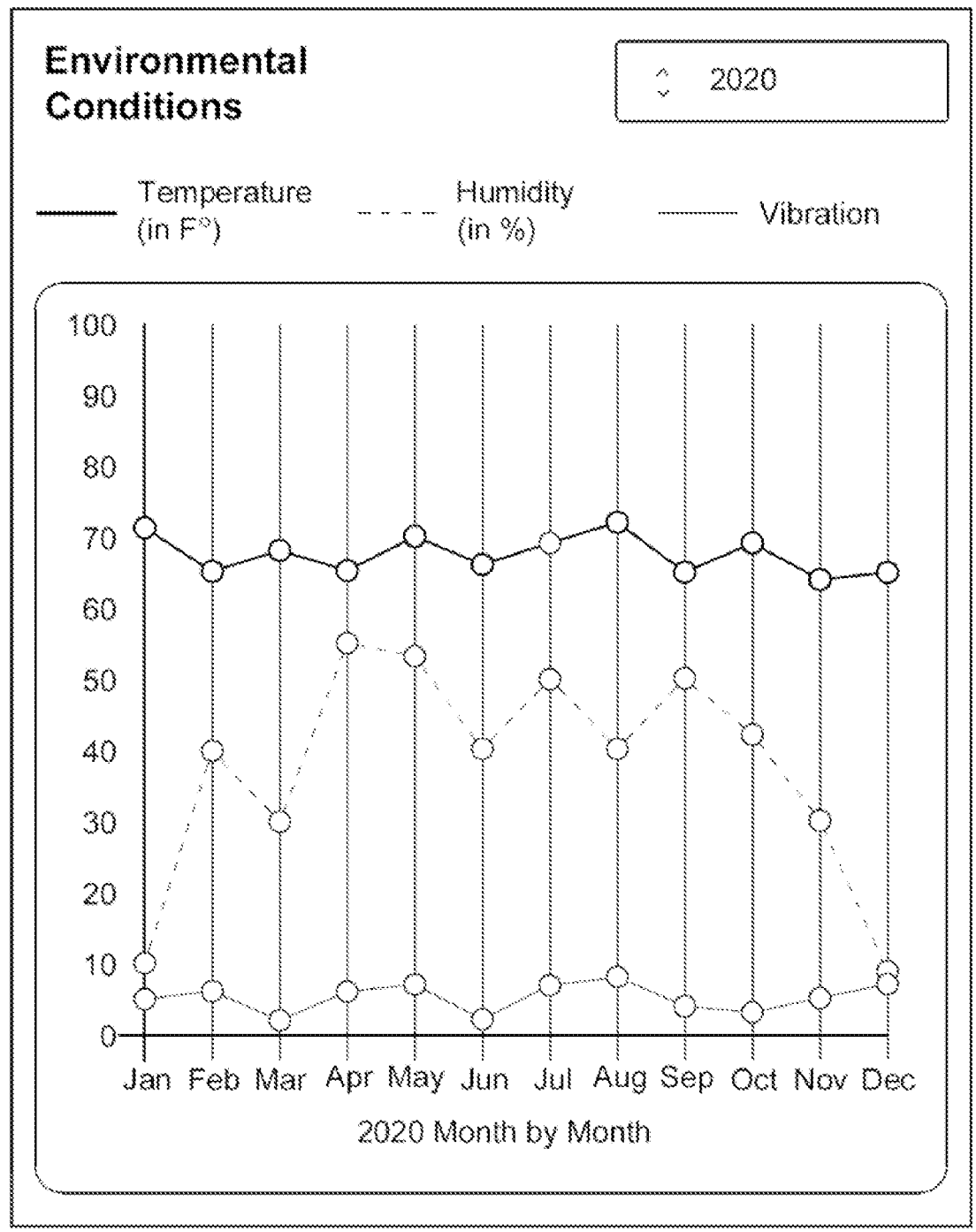
FIG. 5 shows an example user interface depicting example data monitored by an art tracker device in accordance with the present technology.

FIG. 5 shows an example user interface depicting example data monitored by an example embodiment of the art tracker device 100. The example user interface presents a data plot showing continuously-monitored data acquired by the sensor and/or actuator unit 111. The example user interface can be produced via implementations of the app and displayed on a computer device, such as in the example shown in FIG. 4. In this example of the user interface in FIG. 5, the data plot shows the average temperature (in ° F.), average humidity (in %), and micro-vibration data (e.g., normalized or arbitrary unit) of an artistic work to which the example art tracker device 100 was attached and monitored over a year. The example data plot of FIG. 5 illustrates a month-by-month view of multiple health parameters of the artistic work 101 monitored by the example art tracker device 100. Notably, the user interface can also show additional (or less) parameters of the art work monitored by the art tracker, can do so on a different scale of time or other independent variables (e.g., time, location, or other parameter), and can show one or more parameters in various forms (e.g., as raw data, pre-processed data, and/or processed data, such as by empirical, normalized, statistical representations, or other representations).

Figure 6:
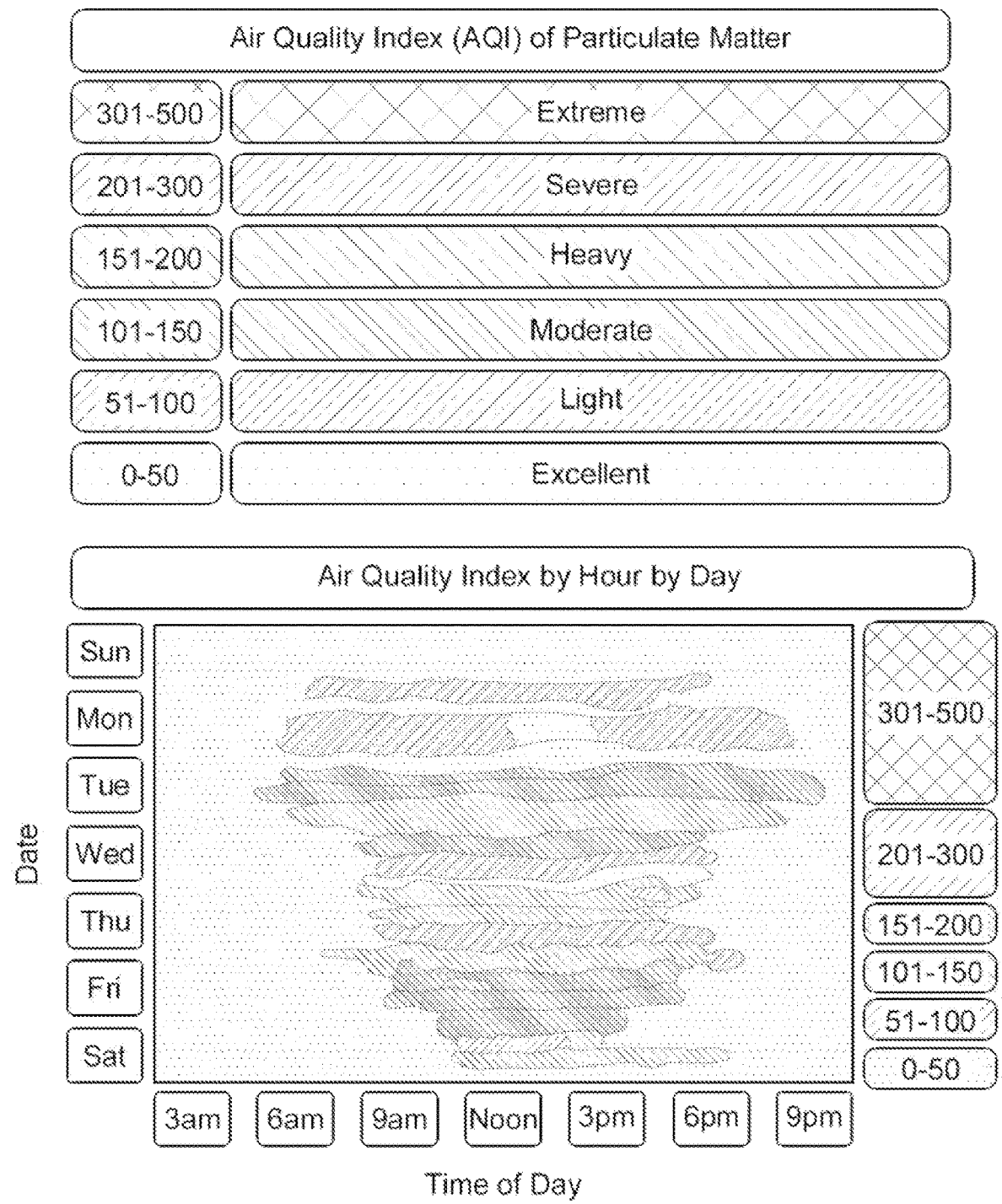
FIG. 6 shows a data plot of example air quality data monitorable by an art tracker device in accordance with the present technology.

FIG. 6 shows a data plot of example air quality data monitorable by an example embodiment of the art tracker device 100. The data plot shows a standard Air Quality Index (AQI) scale (top) juxtaposed next to sample air quality data obtainable by an air quality sensor of the sensor and/or actuator unit 111 of the art tracker device 100, which can be processed to display the measured air quality data with respect to the index over some or all hours of a day and multiple days in a time period (e.g., such as week(s), month(s), year(s), etc.). In this example, the sample air quality data plot of FIG. 6 how the tracked artistic work, monitored by an example art tracker device 100, is exposed to relatively poorer air quality (i.e., one or more certain particulates tracked by the sensor and/or actuator unit 111) around noon on most days Monday-Saturday, while most subjected to the poorer air quality on Tuesday.

Figure 7:
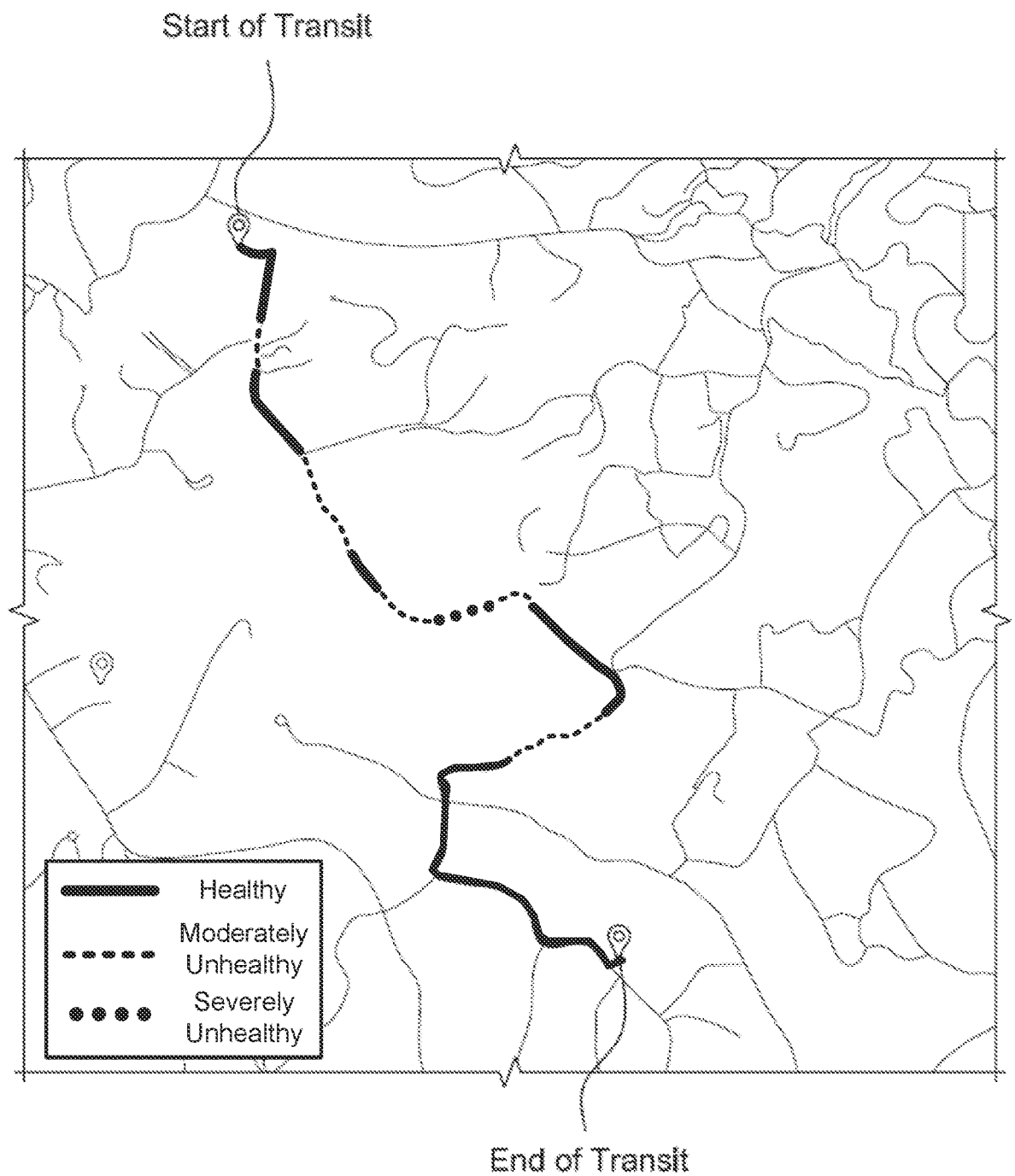
FIG. 7 shows a map plot of example geo-location data monitorable by an art tracker device in accordance with the present technology.

FIG. 7 shows a map plot of example geo-location data monitorable by an example embodiment of the art tracker device 100. The example map plot, in addition to showing location of the artistic work 101 tracked by the example art tracker 100, can embed art health information in the plot. In this example, the solid-lined portions of the highlighted location route superimposed over the map correspond to one or more monitored parameters (e.g., micro-vibration exerted on the art work, orientation of the art work, humidity exhibited by the art work, etc.) that do not exceed a threshold, thereby indicating the art work is in a 'healthy' state in this portion of the transit. However, as shown by the broken-lined and circle-lined portions of the location route, this indicates an 'unhealthy' state where such one or more parameters have exceeded the threshold during this period and at these locations during the transit. In this regard, the art tracker device 100 can synthesize the relationship between these parameters (e.g., monitored parameters like micro-vibrations, orientation, humidity, temperature, etc.) with spatial parameters (e.g., specific location) and temporal parameters (e.g., time of day).

Figure 8:
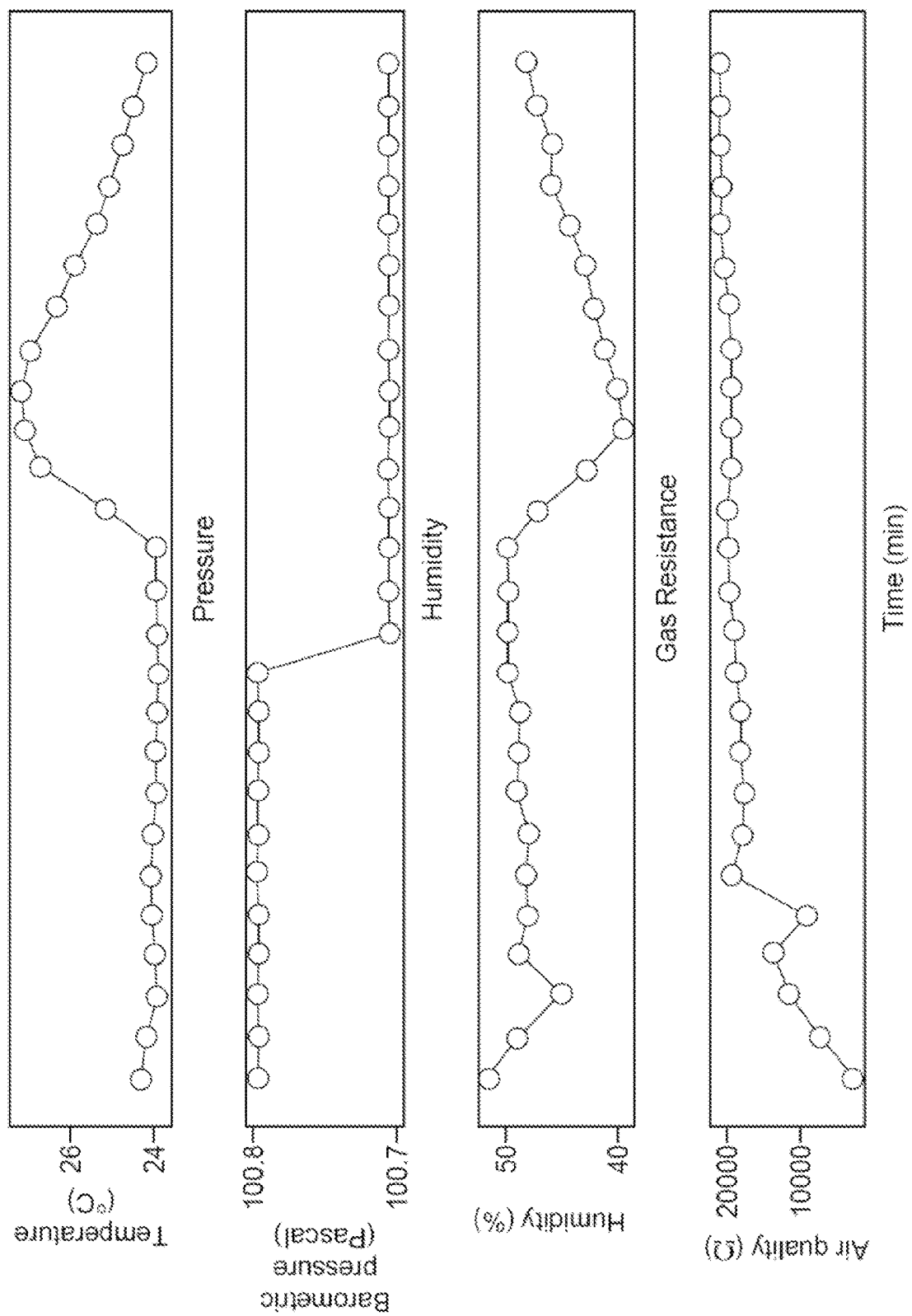
FIG. 8 shows a data plot of example microenvironment data monitorable by an art tracker device in accordance with the present technology.

FIG. 8 shows a data plot of example microenvironment data monitorable by an example embodiment of the art tracker device 100. In this example, an example embodiment of the art tracker device 200 was attached to a top side of the frame of a painting to monitor air quality, humidity, barometric pressure, and temperature of the microenvironment of the painting. These external parameters exhibited on the painting were monitored for a duration of time (e.g., 100 minutes). As the data revealed, over time, the air quality decreased (as the amount of particulates measured increased), while the humidity and temperature fluctuated around the same time point and time period, notably after a barometric pressure change.

Example Use Cases, Advantages, and Benefits of the Art Tracker

Typically, for present and conventional techniques to monitor art, environmental variables are monitored at a room level. However, this does not account for highly variable microclimates that can exist. Works of art can be subject to highly different variables depending on where they are located. Direct exposure to sunlight is one obvious example. For example, differences in temperature may exist between internal or external walls. Humidity can be very different if a work is in the direct path of an air conditioning or heating vent. Proximity to body heat and even exhalation of $CO_2$ can impact the health if a work of art. Vibration in walls can be transmitted differently based on proximity to different materials like pipes in walls or load bearing supports. Even in transit, a work of art may experience significant damage as a result of internal support coming loose or the presence of other bodies acting on the crate or case. And furthermore, extreme events maybe very short in duration and thus not detected based on an infrequent sampling, but yet have long-term damaging impact on the art work.

The following are example uses cases that the disclosed systems and methods are envisioned to provide benefit and overcome significant technical problems not yet overcome by conventional techniques.

In Transit/Virtual Courier. When art is shipped from one location to another, e.g., either as part of a sale or for the purposes of loan for an exhibition, the work is often accompanied by an individual or courier for the entire duration of the trip to ensure that the work is properly cared for. The courier is responsible for the work from crating at the origin to uncrating, and often display, at the destination. The mission is to protect the work from environmental variables and mechanical damage. This role is often mandated by the insurance carrier for the special policy that covers the transportation. Notably, transit-related damage is one of the top two largest sources of insurance claims in the art industry. Typically, there is usually little or no monitoring that is provided to the courier, and thus the courier is only effective as a chaperone who may observe factors, while in transit, that may cause potential damage. Such limitations can be remedied using the disclosed technology. In this case, for example, the art tracker device 100 can augment the abilities of the courier to detect damage and injury to the actual art work (as opposed to a crate or packaging) that is not direct, clear, and/or visible to the courier, and doing so in real time while providing real-time alerts and responses.

Art Lending. As a precondition of art backed loans, art lenders usually mandate that the art be put into the care of a certified art storage facility. The intent is to both protect the value of the work and ensure that art is not moved to a foreign jurisdiction in the case of default. In this case, for example, the art tracker device 100 can provide an effective means of monitoring the health of the art work when it is no longer in the custody of the owner or bank (similar to the In Transit/Virtual Courier use case example). Also, for example, the art tracker device 100 can also protect the need for third party custody since alerts can be set to maintain the geo-fencing of the art work. The specific role will not only monitor for tampering and potential damage, but also serve a similar role as an ankle bracelet does for felons or individuals out on bail.

On Loan or Storage Monitoring. Owners who loan their art or store art run significant risks to the art that can go undetected. Particularly, while the owner may witness the initial packaging of the art work, e.g., in a box, crate, or other secure packaging, the owner can no longer guarantee how the art work will be treated. For example, will the packaging containing the art work be flipped upside down or laid on its front, despite a "This Side Up" and "Fragile" labeling on the packaging? Or even when the art work arrives at its destination, how will the art work be treated when it is out of the packaging? These questions are answerable by the art tracker device 100. For example, for such uses, the art tracker device 100 can continuously and actively monitor physical parameters of the art work itself, such as its orientation, and report the continuously-monitored orientation of the art work to the owner.

Secret Shipper. Art Logistics represents one of the largest risks for art. For example, transportation of art is generally very expensive between logistics charges, couriers and supplemental insurance policies. As a result, there is constant pressure to reduce cost; but, conventionally reducing the costs for transportation often comes with a trade-off of sacrificing the quality of care of the art itself. This trade-off can be resolved with the disclosed art tracker device. For example, with the art tracker, insurance companies and art advisors can measure the risk associated with different modalities of transportation (e.g., trucking, air, sea, including using a common shipping carrier [like UPS, DHL, FedEx, etc.]). Also, using the art tracker, insurance companies can also assess the value and impact of risk mitigation strategies and practices they presently undertake (or fail to undertake), such as use of vibration dampening packaging, climate-controlled containers, distinctions between courier services, and even customs clearing locations. As an example, the art tracker device can be attached to copies of the work to be transported as well as non-valuable art to assess the risks. Additionally, for all valuable works of art, the data compiled from the use of the art tracker in monitoring the art's shipping conditions can be added to a larger dataset of all art, which in turn can be used to refine risk models and optimal logistics plans. In this manner, the art tracker device can serve as a 'secret shipping auditor' that is always omnipresent in the shipping process and can assess and affect the logistics of the way art generally and certain types of art specifically will be shipped.

Proof of Life/Condition. Establishing the health and location of a work of art is critical for the owner and other interested parties such as insurance and art lenders. As a standard process evaluating the location and state of an art work's health is currently an annual or bi-annual process that requires a representative of the interested party to inspect the work. With the disclosed art tracker device, this process is envisioned to be able to be largely eliminated because of the digital provenance and real time information that can be done remotely. Furthermore the tracker can present key information to prospective buyers who are interested in investing or buying the asset.

Conservation Analysis. Conservators typically review an art work in an ad hoc and quasi-subjective manner. Much as a doctor would perform an annual physical examination to assess the health of a patient, conservators will review the state of condition of an art work and provide advice for the preservation of the work, sometimes routinely, but infrequently. Moreover, the conservator's evaluation process to identify possible damage (and in rare instances a root cause of damage) or appropriate remedies is based on guesswork and past experience. Similar to a wearable health tracker device, the disclosed art tracker provides a wealth of daily information that can contribute considerably to the factors that are influencing the health of the work and propose remedies even in the case that damage is not easily detectable. With effective alerts these same conservators can provide remedies to potential issues in near time rather than simply based on periodic check-ups.

EXAMPLES

In some embodiments in accordance with the present technology (example A1), an art tracker device for monitoring conditions internal and external to an artistic work includes a substrate comprising an electrically-insulating material and that is attachable to an artistic work; a plurality of sensors disposed on the substrate and operable to continuously monitor (i) an internal condition that impacts a region or material component of the artistic work itself, (ii) an external condition that impacts a microenvironment surrounding a portion or a whole of the artistic work, or both the internal condition and the external condition, the plurality of sensors comprising a first sensor and a second sensor, wherein the first sensor is operable to detect a first parameter associated with the internal condition and/or the external condition, and the second sensor is operable to detect a second parameter associated with the internal condition and/or the external condition; a signal processing circuit disposed on the substrate and in communication with the plurality of sensors, the signal processing circuit is operable to amplify electrical signals generated by the plurality of sensors; a power supply unit comprising a power source and a control circuit, the power supply unit operable to provide electrical energy to electronic components of the art tracker device; a data processing unit including a processor and a memory disposed on the substrate and in communication with the power supply unit and one or both the signal processing circuit and the plurality of sensors, the data processing unit to process outputs of the plurality of sensors as data associated with one or more conditions of the artistic work; and a communications unit disposed on the substrate and in communication with one or both of the data processing unit and the signal processing circuit to wirelessly transmit, to a remote device, one or both of the amplified electrical signals and the processed data.

Example A2 includes the device of any of examples A1-A18, wherein the plurality of sensor includes two or more of a temperature sensor, a humidity sensor, a micro-vibrational sensor, an air quality sensor, a geo location monitor, an optical sensor, a pressure sensor, a movement sensor, or a position sensor.

Example A3 includes the device of example A2 or of any of examples A1-A18, wherein the motion sensor includes one or more of a gyroscope, an accelerometer, a magnetometer, or an inertial movement unit (IMU).

Example A4 includes the device of example A2 or of any of examples A1-A18, wherein the position sensor includes one or more of a gyroscope, an accelerometer, a magnetometer, or an inertial movement unit (IMU).

Example A5 includes the device of example A2 or of any of examples A1-A18, wherein the pressure sensor includes a force sensitive resistor (FSR) or a strain gauge.

Example A6 includes the device of example A2 or of any of examples A1-A18, wherein the geo-location monitor includes a global positioning system (GPS) and/or a Wi-Fi communications device to provide location information.

Example A7 includes the device of any of examples A1-A18, wherein the art tracker device is capable of inconspicuously attaching to one or more distinct surfaces of the artistic work.

Example A8 includes the device of example A7 or of any of examples A1-A18, wherein the substrate includes two or more segments to inconspicuously attach to two or more distinct surfaces, respectively, wherein a first segment of the two or more segments is configured to attach to a first surface of the artistic work, and a second segment of the two or more segments is configured to attach to a second surface of the artistic work.

Example A9 includes the device of example A8 or of any of examples A1-A18, wherein the first sensor is disposed on the first segment of the substrate, and the second sensor is disposed on the second segment of the substrate.

Example A10 includes the device of example A8 or example A9 or of any of examples A1-A18, wherein the first surface and the second surface of the artistic work are substantially perpendicular to each other, or wherein the first surface, the second surface, and a third surface of the artistic work are perpendicular to each other.

Example A11 includes the device of any of examples A1-A18, wherein the substrate includes a mechanically-flexible and electrically-insulative material, or wherein the substrate is a single material or composite of materials that are mechanically flexible and electrically insulative.

Example A12 includes the device of any of examples A1-A18, wherein the processed data indicates a time stamp at which the first parameter and the second parameter was detected by the plurality of sensors.

Example A13 includes the device of any of examples A1-A18, wherein the processed data includes one or more of (i) a status associated with the artistic work or the microenvironment surrounding the portion or the whole of the artistic work, (ii) an alert associated with the detected first parameter or second parameter exceeding a threshold corresponding to a predetermined or programmable harmful internal condition or a predetermined or programmable harmful external condition, or (iii) a device status associated with the art tracker device.

Example A14 includes the device of any of examples A1-A18, comprising an alert unit including one or more of an LED or a speaker in communication with the data processing unit to generate a visual, auditory, or visual and auditory alert signal associated with an alert event determined by the data processing unit, wherein the data processing unit generates the alert event when the detected first parameter or second parameter exceeds a threshold corresponding to a predetermined or programmable harmful internal condition or a predetermined or programmable harmful external condition.

Example A15 includes the device of any of examples A1-A18, wherein the art tracker device is in communication with a remote computing device including one or more of a smartphone, a tablet, a wearable computing device, an intermediary data router, or a computer including a desktop, laptop, or server computer, wherein the remote computing device is operable to display an output data transmitted from the art tracker device on a display device of the remote computing device.

Example A16 includes the device of any of examples A1-A18, wherein the microenvironment includes a volume at least partially encompassing the portion or the whole of the artistic work, where the volume comprises a space in a range of 0 μm to 100 μm outward from a surface of the encompassed portion or whole of the artistic work, or range of 0 μm to 10 mm outward from a surface of the encompassed portion or whole of the artistic work, or a range of 0 μm to 10 cm outward from a surface of the encompassed portion or whole of the artistic work.

Example A17 includes the device of any of examples A1-A18, wherein the internal condition includes one or more of a material property of one or more materials of the artistic work itself, or a mechanical force applied onto the artistic work.

Example A18 includes the device of any of examples A1-A17, wherein the artistic work includes a painting, sculpture, drawing, photograph, or printed material.

In some embodiments in accordance with the present technology (example A19), an art tracker device for monitoring conditions internal and external to an artistic work includes a substrate attachable to an artistic work; a plurality of sensors disposed on the substrate and operable to continuously monitor (i) an internal condition that impacts a region or material component of the artistic work itself, (ii) an external condition that impacts a microenvironment surrounding a portion or a whole of the artistic work, or both the internal condition and the external condition; a power supply unit comprising a power source and a control circuit, the power supply unit operable to provide electrical energy to electronic components of the art tracker device; a data processing unit including a processor and a memory disposed on the substrate and in communication with the power supply unit and the plurality of sensors, the data processing unit to process outputs of the plurality of sensors as data associated with one or more conditions of the artistic work; and a communications unit disposed on the substrate and in communication with the data processing unit to wirelessly transmit an output of the art tracker device to a remote device.

Example A20 includes the device of example A19, wherein the art tracker device includes one or more features of any of examples A1-A18.

In some embodiments in accordance with the present technology (example B1), an art tracker device for monitoring health of an art work includes a substrate capable of attaching to an artistic work or accessory associated with the artistic work; a plurality of sensors disposed on the substrate and operable to continuously or intermittently monitor (i) an internal condition that impacts a region or material component of the artistic work itself, (ii) an external condition from a microenvironment of the artistic work that impacts a portion or a whole of the artistic work, or (iii) both the internal condition and the external condition, the plurality of sensors comprising a first sensor and a second sensor, wherein the first sensor is operable to detect a first parameter associated with the internal condition and/or the external condition, and the second sensor is operable to detect a second parameter associated with the internal condition and/or the external condition; a signal processing circuit disposed on the substrate and in communication with the plurality of sensors, the signal processing circuit is operable to amplify electrical signals generated by the plurality of sensors; a power supply unit comprising a power source and a control circuit, the power supply unit operable to provide electrical energy to electronic components of the art tracker device; a data processing unit including a processor and a memory disposed on the substrate and in communication with the power supply unit and one or both of the signal processing circuit and the plurality of sensors, wherein the data processing unit is configured to process outputs of the plurality of sensors as data associated with one or more conditions of the artistic work; and a communications unit disposed on the substrate and in communication with one or both of the data processing unit and the signal processing circuit to wirelessly transmit, to a remote device, one or both of the amplified electrical signals and the data associated with one or more conditions of the artistic work.

Example B2 includes the art tracker device of any of examples B1-B30, wherein the art tracker device is capable of inconspicuously attaching to one or more distinct surfaces of the artistic work or the accessory associated with the artistic work.

Example B3 includes the art tracker device of example B2 or any of examples B1-B30, wherein the substrate includes two or more segments to attach to two or more distinct surfaces, respectively, of the artistic work or the accessory associated with the artistic work.

Example B4 includes the art tracker device of example B3 or any of examples B1-B30, wherein a first segment of the two or more segments is configured to attach to a first surface of the artistic work or the accessory associated with the artistic work, and a second segment of the two or more segments is configured to attach to a second surface of the artistic work or the accessory associated with the artistic work, and wherein the first sensor is disposed on the first segment of the substrate, and the second sensor is disposed on the second segment of the substrate.

Example B5 includes the art tracker device of example B4 or any of examples B1-B30, wherein the first surface and the second surface of the artistic work or the accessory associated with the artistic work are substantially perpendicular to each other, or wherein the first surface and the second surface of the artistic work or the accessory associated with the artistic work are along a curved surface of different curvatures with respect to each other.

Example B6 includes the art tracker device of any of examples B1-B30, wherein the plurality of sensor includes two or more of a temperature sensor, a humidity sensor, a micro-vibrational sensor, an air quality sensor, a geo location monitor, an optical sensor, a pressure sensor, a movement sensor, or a position sensor.

Example B7 includes the art tracker device of example B6 or any of examples B1-B30, wherein the motion sensor includes one or more of a gyroscope, an accelerometer, a magnetometer, or an inertial movement unit (IMU).

Example B8 includes the art tracker device of example B6 or any of examples B1-B30, wherein the position sensor includes one or more of a gyroscope, an accelerometer, a magnetometer, or an inertial movement unit (IMU).

Example B9 includes the art tracker device of example B6 or any of examples B1-B30, wherein the pressure sensor includes a force sensitive resistor (FSR) or a strain gauge.

Example B10 includes the art tracker device of example B6 or any of examples B1-B30, wherein the geo-location monitor includes a global positioning system (GPS) and/or a Wi-Fi communications device to provide location information.

Example B11 includes the art tracker device of any of examples B1-B30, wherein the power supply unit includes a power generation device in electrical communication with the control circuit, wherein the control circuit is operable to control electrical power drawn from the power source by the electronic components of the art tracker device and control electrical power generated from the power generation device to supply electrical energy to the power source.

Example B12 includes the art tracker device of example B11 or any of examples B1-B30, wherein the data processing unit is configured to command the control circuit to allow the electrical power to be drawn from the power source by the electronic components of the art tracker device based on the data processed from the outputs of the plurality of sensors.

Example B13 includes the art tracker device of example B12 or any of examples B1-B30, wherein the data processing unit is configured to receive external data from an external device in a facility where the artistic work is located and to process the external data with the data associated with one or more conditions of the artistic work and generate an instruction to command the control circuit.

Example B14 includes the art tracker device of example B12 or any of examples B1-B30, wherein the power generation device includes one or both of a solar cell and a fuel cell, wherein the power source includes a battery.

Example B15 includes the art tracker device of any of examples B1-B30, wherein the data processing unit is configured to process the data associated with the one or more conditions of the artistic work to create health information about the artistic work.

Example B16 includes the art tracker device of example B15 or any of examples B1-B30, wherein the health information is included in a non-fungible token (NFT) associated with a unique identifier of the artistic work in a blockchain.

Example B17 includes the art tracker device of example B16 or any of examples B1-B30, wherein the unique identifier includes a near field communication (NFC) tag and/or a radio frequency identification (RFID) tag.

Example B18 includes the art tracker device of example B15 or any of examples B1-B30, wherein the data processing unit is configured to determine a safety level of the health information, and, when the safety level is determined to be below a safety threshold indicative of a danger to the artistic work, the data processing unit is configured to actuate a response to mitigate the danger to the artistic work.

Example B19 includes the art tracker device of example B18 or any of examples B1-B30, the data processing unit is configured to send a control signal to the remote device comprising an external device in a facility where the artistic work is located, wherein the control signal facilities the external device changing a condition in the facility.

Example B20 includes the art tracker device of any of examples B1-B30, wherein the substrate includes a mechanically-flexible and electrically-insulative material, or wherein the substrate is a single material or composite of materials that are mechanically flexible and electrically insulative.

Example B21 includes the art tracker device of any of examples B1-B30, wherein the data processed by the data processing unit indicates a time stamp at which the first parameter and the second parameter was detected by the plurality of sensors.

Example B22 includes the art tracker device of any of examples B1-B30, wherein the data processed by the data processing unit includes one or more of (i) a health status associated with the artistic work, (ii) an alert associated with the detected first parameter or second parameter exceeding a threshold corresponding to a predetermined or programmable harmful internal condition or a predetermined or programmable harmful external condition, or (iii) a device status associated with the art tracker device.

Example B23 includes the art tracker device of example B22 or any of examples B1-B30, wherein the communications unit is configured to transmit a data communication to the remote device associated with the one or more of the health status, the alert, or the device status.

Example B24 includes the art tracker device of any of examples B1-B30, comprising: an alert unit including one or more of an LED or a speaker in communication with the data processing unit to generate a visual, auditory, or visual and auditory alert signal associated with an alert event determined by the data processing unit, wherein the data processing unit is configured to generate the alert event when the detected first parameter or second parameter exceeds a threshold corresponding to a predetermined or programmable harmful internal condition or a predetermined or programmable harmful external condition.

Example B25 includes the art tracker device of any of examples B1-B30, wherein the art tracker device is in wireless communication with the remote device, which includes one or more of a smartphone, a tablet, a wearable computing device, an intermediary data router, or a computer including a desktop, laptop, or server computer.

Example B26 includes the art tracker device of any of examples B1-B30, wherein the microenvironment includes a volume at least partially encompassing the portion or the whole of the artistic work, where the volume comprises a range of 0 µm to 100 µm outward from a surface of the artistic work, or range of 0 µm to 10 mm outward from a surface of the artistic work, or a range of 0 µm to 10 cm outward from a surface of the artistic work.

Example B27 includes the art tracker device of any of examples B1-B30, wherein the internal condition includes one or more of: a material property of one or more materials or one or more components of the artistic work, a mechanical force applied onto and/or propagating within the artistic work, an electrical property of one or more materials or one or more components of the artistic work, or a hydrophilicity or hydrophobicity of one or more materials or one or more components of the artistic work.

Example B28 includes the art tracker device of any of examples B1-B30, wherein the external condition includes one or more of a temperature, a humidity, a barometric pressure, a concentration of particulates in air indicative of an air quality, an amount and/or frequency of light, a vibration, an applied strain or stress, or an instantaneous movement.

Example B29 includes the art tracker device of any of examples B1-B30, wherein the accessory associated with the artistic work includes a frame, a picture border, a stand, or a case.

Example B30 includes the art tracker device of any of examples B1-B29, wherein the artistic work includes a painting, sculpture, drawing, photograph, or printed material.

In some embodiments in accordance with the present technology (example B31), an art tracker device for monitoring health of an art work includes a substrate attachable to an artistic work; a plurality of sensors disposed on the substrate and operable to monitor (i) an internal condition that impacts a region or material component of the artistic work itself, (ii) an external condition from a microenvironment of the artistic work that impacts a portion or a whole of the artistic work, or (iii) both the internal condition and the external condition; a power supply unit comprising a power source and a control circuit, the power supply unit operable to provide electrical energy to electronic components of the art tracker device; a data processing unit including a processor and a memory disposed on the substrate and in communication with the power supply unit and the plurality of sensors, the data processing unit to process outputs of the plurality of sensors as data associated with one or more conditions of the artistic work; and a communications unit disposed on the substrate and in communication with the data processing unit to wirelessly transmit an output of the art tracker device to a remote device.

Example B32 includes the art tracker device of B31, wherein the art tracker device includes one or more features of any of examples B1-B30.

In some embodiments in accordance with the present technology (example B33), an art tracker device for monitoring health of an art work includes a substrate capable of attaching to an artistic work or accessory associated with the artistic work; a sensor disposed on the substrate and operable to monitor an external condition from a microenvironment of the artistic work that impacts a portion or a whole of the artistic work, wherein the sensor is operable to detect a parameter associated with the external condition; and a communications unit disposed on the substrate and in communication with the sensor to wirelessly transmit, to a remote device, an output signal from the sensor indicative of the detected parameter.

Example B34 includes the art tracker device of any of examples B33-B48, comprising: a signal processing circuit disposed on the substrate and in communication with the sensor, the signal processing circuit operable to amplify electrical signals transduced by the sensor from detection of the parameter associated with the external condition.

Example B35 includes the art tracker device of any of examples B33-B48, comprising: a power supply unit comprising a power source and a control circuit disposed on the substrate, the power supply unit operable to provide electrical energy to electronic components of the art tracker device.

Example B36 includes the art tracker device of any of examples B33-B48, comprising: a data processing unit including a processor and a memory disposed on the substrate and in communication with the sensor and the communications unit, the data processing unit configured to process the output signal indicative of the detected parameter from the sensor as data associated with the external condition of the artistic work.

Example B37 includes the art tracker device of example B36 or any of examples B33-B48, wherein the data processed by the data processing unit includes one or more of (i) a status associated with the artistic work or the microenvironment surrounding the portion or the whole of the artistic work, (ii) an alert associated with the detected parameter exceeding a threshold corresponding to a predetermined or programmable harmful external condition, or (iii) a device status associated with the art tracker device.

Example B38 includes the art tracker device of any of examples B33-B48, wherein the sensor includes one or more of a temperature sensor, a humidity sensor, a micro-vibrational sensor, an air quality sensor, a geo location monitor, an optical sensor, a pressure sensor, a movement sensor, or a position sensor.

Example B39 includes the art tracker device of any of examples B33-B48, wherein the substrate includes two or more segments to attach to two or more distinct surfaces, respectively, wherein a first segment of the two or more segments is configured to attach to a first surface of the artistic work, and a second segment of the two or more segments is configured to attach to a second surface of the artistic work.

Example B40 includes the art tracker device of example B39 or any of examples B33-B48, wherein the sensor is disposed on the first segment of the substrate, and the communications unit is disposed on the second segment of the substrate.

Example B41 includes the art tracker device of example B40 any of examples B33-B48, wherein the first surface and the second surface of the artistic work are substantially perpendicular to each other.

Example B42 includes the art tracker device of any of examples B33-B48, wherein the substrate includes a mechanically-flexible and electrically-insulative material, or wherein the substrate is a single material or composite of materials that are mechanically flexible and electrically insulative.

Example B43 includes the art tracker device of any of examples B33-B48, wherein the art tracker device is in communication with the remote device, wherein the remote device including one or more of a smartphone, a tablet, a wearable computing device, an intermediary data router, or a computer including a desktop, laptop, or server computer.

Example B44 includes the art tracker device of any of examples B33-B48, wherein the microenvironment includes a volume at least partially encompassing the portion or the whole of the artistic work, where the volume comprises a range of 0 μm to 100 μm outward from a surface of the artistic work, or range of 0 μm to 10 mm outward from a surface of the artistic work, or a range of 0 μm to 10 cm outward from a surface of the artistic work.

Example B45 includes the art tracker device of any of examples B33-B48, wherein the external condition includes one or more of a temperature, a humidity, a barometric pressure, a concentration of particulates in air indicative of an air quality, an amount and/or frequency of light, a vibration, an applied strain or stress, or an instantaneous movement.

Example B46 includes the art tracker device of any of examples B33-B48, wherein the internal condition includes one or more of: a material property of one or more materials or one or more components of the artistic work, a mechanical force applied onto and/or propagating within the artistic work, an electrical property of one or more materials or one or more components of the artistic work, or a hydrophilicity or hydrophobicity of one or more materials or one or more components of the artistic work.

Example B47 includes the art tracker device of any of examples B33-B48, wherein the accessory associated with the artistic work includes a frame, a picture border, a stand, or a case.

Example B48 includes the art tracker device of any of examples B33-B47, wherein the artistic work includes a painting, sculpture, drawing, photograph, or printed material.

In some embodiments in accordance with the present technology (example B49), an art tracker device for monitoring health of an art work, comprising: a substrate capable of attaching to an artistic work or accessory associated with the artistic work; a sensor disposed on the substrate and operable to monitor an internal condition that impacts one or more of a region, a material, or a component of the artistic work itself, wherein the sensor is operable to detect a parameter associated with the internal condition; and a communications unit disposed on the substrate and in communication with the sensor to wirelessly transmit, to a remote device, an output signal from the sensor indicative of the detected parameter.

Example B50 includes the art tracker device of any of examples B49-B64, comprising: a signal processing circuit disposed on the substrate and in communication with the sensor, the signal processing circuit operable to amplify electrical signals transduced by the sensor from detection of the parameter associated with the internal condition.

Example B51 includes the art tracker device of any of examples B49-B64, comprising: a power supply unit comprising a power source and a control circuit disposed on the substrate, the power supply unit operable to provide electrical energy to electronic components of the art tracker device.

Example B52 includes the art tracker device of any of examples B49-B64, comprising: a data processing unit including a processor and a memory disposed on the substrate and in communication with the sensor and the communications unit, the data processing unit configured to process the output signal indicative of the detected parameter from the sensor as data associated with the internal condition of the artistic work.

Example B53 includes the art tracker device of example B52 or any of examples B49-B64, wherein the data processed by the data processing unit includes one or more of (i) a health status associated with the artistic work indicative of whether the internal condition is safe or harmful to the artistic work, (ii) an alert associated with the detected parameter exceeding a threshold corresponding to a predetermined or programmable harmful internal condition, or (iii) a device status associated with the art tracker device.

Example B54 includes the art tracker device of any of examples B49-B64, wherein the sensor includes one or more of a temperature sensor, a humidity sensor, a micro-vibrational sensor, an air quality sensor, a geo location monitor, an optical sensor, a pressure sensor, a movement sensor, or a position sensor.

Example B55 includes the art tracker device of any of examples B49-B64, wherein the substrate includes two or more segments to attach to two or more distinct surfaces, respectively, wherein a first segment of the two or more segments is configured to attach to a first surface of the artistic work, and a second segment of the two or more segments is configured to attach to a second surface of the artistic work.

Example B56 includes the art tracker device of example B55 or any of examples B49-B64, wherein the sensor is disposed on the first segment of the substrate, and the communications unit is disposed on the second segment of the substrate.

Example B57 includes the art tracker device of example B56 or any of examples B49-B64, wherein the first surface and the second surface of the artistic work are substantially perpendicular to each other.

Example B58 includes the art tracker device of any of examples B49-B64, wherein the substrate includes a mechanically-flexible and electrically-insulative material, or wherein the substrate is a single material or composite of materials that are mechanically flexible and electrically insulative.

Example B59 includes the art tracker device of any of examples B49-B64, wherein the art tracker device is in communication with the remote device, wherein the remote device including one or more of a smartphone, a tablet, a wearable computing device, an intermediary data router, or a computer including a desktop, laptop, or server computer.

Example B60 includes the art tracker device of any of examples B49-B64, wherein the microenvironment includes a volume at least partially encompassing the portion or the whole of the artistic work, where the volume comprises a range of 0 μm to 100 μm outward from a surface of the artistic work, or range of 0 μm to 10 mm outward from a surface of the artistic work, or a range of 0 μm to 10 cm outward from a surface of the artistic work.

Example B61 includes the art tracker device of any of examples B49-B64, wherein the external condition includes one or more of a temperature, a humidity, a barometric pressure, a concentration of particulates in air indicative of an air quality, an amount and/or frequency of light, a vibration, an applied strain or stress, or an instantaneous movement.

Example B62 includes the art tracker device of any of examples B49-B64, wherein the internal condition includes one or more of: a material property of one or more materials or one or more components of the artistic work, a mechanical force applied onto and/or propagating within the artistic work, an electrical property of one or more materials or one or more components of the artistic work, or a hydrophilicity or hydrophobicity of one or more materials or one or more components of the artistic work.

Example B63 includes the art tracker device of any of examples B49-B64, wherein the accessory associated with the artistic work includes a frame, a picture border, a stand, or a case.

Example B64 includes the art tracker device of any of examples B49-B63, wherein the artistic work includes a painting, sculpture, drawing, photograph, or printed material.

In some embodiments in accordance with the present technology (example B65), an art tracker device for monitoring health of an art work includes a substrate capable of attaching to an artistic work or accessory associated with the artistic work; a plurality of sensors disposed on the substrate and operable to monitor (i) an internal condition that impacts a region or material component of the artistic work itself, (ii) an external condition from a microenvironment of the artistic work that impacts a portion or a whole of the artistic work, or (iii) both the internal condition and the external condition, the plurality of sensors comprising a first sensor and a second sensor, wherein the first sensor is operable to detect a first parameter associated with the internal condition and/or the external condition, and the second sensor is operable to detect a second parameter associated with the internal condition and/or the external condition; a power supply unit comprising a power source and a control circuit, the power supply unit operable to provide electrical energy to at least some components of the art tracker device; a data processing unit including a processor and a memory disposed on the substrate and in communication with the plurality of sensors and the power supply unit, wherein the data processing unit is configured to process outputs of the plurality of sensors as data associated with the internal condition of the artistic work, the external condition from the microenvironment of the artistic work, or both the internal condition and the external condition, and wherein the data processing unit is configured to command the control circuit to allow the electrical power to be drawn from the power source by the electronic components of the art tracker device based on the data associated with the internal condition of the artistic work, the external condition from the microenvironment of the artistic work, or both the internal condition and the external condition; and a communications unit disposed on the substrate to wirelessly transmit, to a remote device, one or both of the outputs of the plurality of sensors and the data of the data processing unit.

Example B66 includes the art tracker device of any of examples B65-B75, wherein the substrate includes two or more segments to attach to two or more distinct surfaces, respectively, of the artistic work or accessory associated with the artistic work.

Example B67 includes the art tracker device of example B66 or any of examples B65-B75, wherein a first segment of the two or more segments is configured to attach to a first surface of the artistic work or the accessory associated with the artistic work, and a second segment of the two or more segments is configured to attach to a second surface of the artistic work or the accessory associated with the artistic work, and wherein the first sensor is disposed on the first segment of the substrate, and the second sensor is disposed on the second segment of the substrate.

Example B68 includes the art tracker device of any of examples B65-B75, comprising: a signal processing circuit disposed on the substrate and in communication with the sensor, the signal processing circuit operable to amplify electrical signals transduced by the sensor from detection of the parameter associated with the internal condition.

Example B69 includes the art tracker device of any of examples B65-B75, wherein the plurality of sensor includes two or more of a temperature sensor, a humidity sensor, a micro-vibrational sensor, an air quality sensor, a geo location monitor, an optical sensor, a pressure sensor, a movement sensor, or a position sensor.

Example B70 includes the art tracker device of any of examples B65-B75, wherein the substrate includes a mechanically-flexible and electrically-insulative material, or wherein the substrate is a single material or composite of materials that are mechanically flexible and electrically insulative.

Example B71 includes the art tracker device of any of examples B65-B75, wherein the microenvironment includes a volume at least partially encompassing the portion or the whole of the artistic work, where the volume comprises a range of 0 μm to 100 μm outward from a surface of the artistic work, or range of 0 μm to 10 mm outward from a surface of the artistic work, or a range of 0 μm to 10 cm outward from a surface of the artistic work.

Example B72 includes the art tracker device of any of examples B65-B75, wherein the external condition includes one or more of a temperature, a humidity, a barometric pressure, a concentration of particulates in air indicative of an air quality, an amount and/or frequency of light, a vibration, an applied strain or stress, or an instantaneous movement.

Example B73 includes the art tracker device of any of examples B65-B75, wherein the internal condition includes one or more of: a material property of one or more materials or one or more components of the artistic work, a mechanical force applied onto and/or propagating within the artistic work, an electrical property of one or more materials or one or more components of the artistic work, or a hydrophilicity or hydrophobicity of one or more materials or one or more components of the artistic work.

Example B74 includes the art tracker device of any of examples B65-B75, wherein the accessory associated with the artistic work includes a frame, a picture border, a stand, or a case.

Example B75 includes the art tracker device of any of examples B65-B74, wherein the artistic work includes a painting, sculpture, drawing, photograph, or printed material.

In some embodiments in accordance with the present technology (example B76), a device for monitoring conditions of a physical object includes a substrate capable of attaching to the physical object; one or more sensors disposed on the substrate and operable to continuously or intermittently monitor at least one of (i) an internal condition that impacts a region or material component of the physical object itself, or (ii) an external condition from a microenvironment of the physical object; a power supply unit comprising a power source and a control circuit, the power supply unit operable to provide electrical energy to at least some components of the device; and a communications unit disposed on the substrate to wirelessly transmit, to a remote device, a transmission signal including information associated with an output of the one or more sensors.

Example B77 includes the device of any of examples B76-B88, comprising: a data processing unit including a processor and a memory disposed on the substrate and in communication with the one or more sensors and the power supply unit, wherein the data processing unit is configured to process the output of the one or more sensors as data associated with the internal condition of the physical object, the external condition from the microenvironment of the physical object, or both the internal condition and the external condition.

Example B78 includes the device of example B77 or any of examples B76-B88, wherein the data processing unit is configured to command the control circuit to allow the electrical power to be drawn from the power source by the electronic components of the device based on the data associated with the internal condition, the external condition, or both the internal condition and the external condition.

Example B79 includes the device of any of examples B76-B88, wherein the substrate includes two or more segments to attach to two or more distinct surfaces, respectively, of the physical object.

Example B80 includes the device of example B79 or any of examples B76-B88, wherein a first segment of the two or more segments is configured to attach to a first surface of the physical object, and a second segment of the two or more segments is configured to attach to a second surface of the physical object, and wherein the first sensor is disposed on the first segment of the substrate, and the second sensor is disposed on the second segment of the substrate.

Example B81 includes the device of any of examples B76-B88, wherein the plurality of sensor includes two or more of a temperature sensor, a humidity sensor, a microvibrational sensor, an air quality sensor, a geo location monitor, an optical sensor, a pressure sensor, a movement sensor, or a position sensor.

Example B82 includes the device of any of examples B76-B88, wherein the substrate includes a mechanically-flexible and electrically-insulative material, or wherein the substrate is a single material or composite of materials that are mechanically flexible and electrically insulative.

Example B83 includes the device of any of examples B76-B88, wherein the microenvironment includes a volume at least partially encompassing a portion or a whole of the physical object, where the volume comprises a range of 0 µm to 100 µm outward from a surface of the physical object, or range of 0 µm to 10 mm outward from a surface of the physical object, or a range of 0 µm to 10 cm outward from a surface of the physical object.

Example B84 includes the device of any of examples B76-B88, wherein the external condition includes one or more of a temperature, a humidity, a barometric pressure, a concentration of particulates in air indicative of an air quality, an amount and/or frequency of light, a vibration, an applied strain or stress, or an instantaneous movement.

Example B85 includes the device of any of examples B76-B88, wherein the internal condition includes one or more of: a material property of one or more materials or one or more components of the physical object, a mechanical force applied onto and/or propagating within the physical object, an electrical property of one or more materials or one or more components of the physical object, or a hydrophilicity or hydrophobicity of one or more materials or one or more components of the physical object.

Example B86 includes the device of any of examples B76-B88, wherein the physical object includes an artistic work or a non-artistic work.

Example B87 includes the device of example B86 or any of examples B76-B88, wherein the artistic work includes a painting, sculpture, drawing, photograph, or printed material.

Example B88 includes the device of example B86 or any of examples B76-B87, wherein the non-artistic work includes a luxury good including a jewelry, a wine, or a designer clothing, or wherein the non-artistic work includes a non-luxury good including a perishable-item, a package, or a computer or electronic device.

In some embodiments in accordance with the present technology (example B89), a method for monitoring health of an art work includes detecting, by one or more sensors disposed on a substrate of a device that is attached to an artistic work or an accessory associated with the artistic work, one or both of an internal condition that impacts a region or material component of the artistic work itself and an external condition from a microenvironment of the artistic work that impacts a portion or a whole of the artistic work; processing, by a processor disposed on the substrate of the device, data associated with the internal condition of the artistic work, the external condition from the microenvironment of the artistic work, or both the internal condition and the external condition to produce health information about the artistic work; and wirelessly transmitting to a remote device, by a transmitter disposed on the substrate of the device, the processed data associated with the internal condition of the artistic work, the external condition from the microenvironment of the artistic work, or both the internal condition and the external condition.

Example B90 includes the method of any of examples B89-B103, comprising: processing, by the process, the one or both of the internal condition and the external condition to control an amount of electrical power from a power source of the device to supply electronic components of the device.

Example B91 includes the method of example B90 or any of examples B89-B103, comprising: commanding, by the processor, a control circuit of the device to allow the electrical power to be drawn from the power source by the electronic components of the device based on the processed data associated with the internal condition of the artistic work, the external condition from the microenvironment of the artistic work, or both the internal condition and the external condition.

Example B92 includes the method of example B91 or any of examples B89-B103, wherein the device includes a power generation device in electrical communication with the control circuit, wherein the method comprises: controlling, by the processor, electrical power generated from the power generation device to supply electrical energy to the power source; and commanding, by the processor, the control circuit to allow the electrical power to be drawn from the power source by the electronic components of the device based on the processed data associated with the internal condition of the artistic work, the external condition from the microenvironment of the artistic work, or both the internal condition and the external condition.

Example B93 includes the method of example B92 or any of examples B89-B103, wherein the power generation device includes one or both of a solar cell and a fuel cell, wherein the power source includes a battery.

Example B94 includes the method of any of examples B89-B103, wherein the health information is included in a non-fungible token (NFT) associated with a unique identifier of the artistic work in a blockchain.

Example B95 includes the method of any of examples B89-B103, comprising: determining, by the processor, a safety level of the health information based on a comparative analysis of the health information with threshold values associated with the internal condition and the external condition.

Example B96 includes the method of example B95 or any of examples B89-B103, comprising: analyzing, by the processor, whether the safety level is exceeds at least one of the threshold values that is indicative of a danger to the artistic work.

Example B97 includes the method of example B96 or any of examples B89-B103, comprising: receiving, by the processor, external data from an external device in a facility where the artistic work is located; processing, by the processor, the external data with the health information and/or the safety level; and transmitting, by the transmitter, a control signal to the external device to instruct the external device to change a condition in the facility.

Example B98 includes the method of example B96 or any of examples B89-B103, comprising: processing, by the processor, the external data with the health information and/or the safety level; generating, by the processor, an alert instruction; and transmitting, by the transmitter, a signal to the remote device with the alert instruction, and/or generating, by an alert unit comprising at least one of a visual indicator or auditory indicator, an alert signal from the device.

Example B99 includes the method of any of examples B89-B103, wherein the microenvironment includes a volume at least partially encompassing the portion or the whole of the artistic work, where the volume comprises a range of 0 µm to 100 µm outward from a surface of the artistic work, or range of 0 µm to 10 mm outward from a surface of the artistic work, or a range of 0 µm to 10 cm outward from a surface of the artistic work.

Example B100 includes the method of any of examples B89-B103, wherein the external condition includes one or more of a temperature, a humidity, a barometric pressure, a concentration of particulates in air indicative of an air quality, an amount and/or frequency of light, a vibration, an applied strain or stress, or an instantaneous movement.

Example B101 includes the method of any of examples B89-B103, wherein the internal condition includes one or more of: a material property of one or more materials or one or more components of the artistic work, a mechanical force applied onto and/or propagating within the artistic work, an electrical property of one or more materials or one or more components of the artistic work, or a hydrophilicity or hydrophobicity of one or more materials or one or more components of the artistic work.

Example B102 includes the method of any of examples B89-B103, wherein the accessory associated with the artistic work includes a frame, a picture border, a stand, or a case.

Example B103 includes the method of any of examples B89-B102, wherein the artistic work includes a painting, sculpture, drawing, photograph, or printed material.

In some embodiments in accordance with the present technology (example B104), a system for monitoring conditions of a physical object, comprising: any of the devices of examples B1-B88; the remote device; and a database.

Example B105 includes the system of example B104, wherein the system includes any single feature or combination of the features of any of examples B1-B103.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

The disclosed system and methods address device-centric challenges of examining physical properties of materials and tangible objects, with some examples including paintings, sculptures, drawings and other artistic works and high-end articles. Aspects of the disclosed methods are necessarily rooted in computer technology to specifically overcome problems of identifying, characterizing and classifying unique physical features of such materials and objects, as well as to improve the functioning of the analysis instruments, by using computerized analytical processing techniques.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An art tracker device for monitoring health of an art work, comprising:
    a substrate that is contiguous and capable of attaching to an artistic work or accessory associated with the artistic work;
    a plurality of sensors disposed on the substrate and operable to monitor (i) an internal condition that impacts a region or material component of the artistic work itself, (ii) an external condition from a microenvironment of the artistic work that impacts a portion or a whole of the artistic work, or (iii) both the internal condition and the external condition, the plurality of sensors comprising a first sensor and a second sensor, wherein the first sensor is operable to detect a first parameter associated with the internal condition and/or the external condition, and the second sensor is operable to detect a second parameter associated with the internal condition and/or the external condition, wherein the substrate includes two or more segments to attach to two or more distinct surfaces in two or more planes, respectively, of the artistic work or the accessory associated with the artistic work;
    a power supply unit comprising a power source and a control circuit, the power supply unit operable to provide electrical energy to at least some components of the art tracker device;
    a data processing unit including a processor and a memory disposed on the substrate and in communication with the plurality of sensors and the power supply unit, wherein the data processing unit is configured to process outputs of the plurality of sensors as data associated with the internal condition of the artistic work, the external condition from the microenvironment of the artistic work, or both the internal condition and the external condition, and wherein the data processing unit is configured to command the control circuit to allow electrical power to be drawn from the power source by electronic components of the art tracker device based on the data associated with the internal condition of the artistic work, the external condition from the microenvironment of the artistic work, or both the internal condition and the external condition; and
    a communications unit disposed on the substrate to wirelessly transmit, to a remote device, one or both of the outputs of the plurality of sensors and the data of the data processing unit.

2. The art tracker device of claim 1, wherein a first segment of the two or more segments is configured to attach to a first surface of the artistic work or the accessory associated with the artistic work, and a second segment of the two or more segments is configured to attach to a second surface of the artistic work or the accessory associated with the artistic work, and wherein the first sensor is disposed on the first segment of the substrate, and the second sensor is disposed on the second segment of the substrate.

3. The art tracker device of claim 1, comprising:
    a signal processing circuit disposed on the substrate and in communication with the plurality of sensors, the signal processing circuit operable to amplify electrical signals transduced by a sensor of the plurality of sensors from detection of a parameter associated with the internal condition and/or the external condition.

4. The art tracker device of claim 1, wherein the plurality of sensors includes two or more of a temperature sensor, a humidity sensor, a micro-vibrational sensor, an air quality sensor, a geo location monitor, an optical sensor, a pressure sensor, a movement sensor, or a position sensor.

5. The art tracker device of claim 1, wherein the substrate includes a mechanically-flexible and electrically-insulative material, or wherein the substrate is a single material or composite of materials that are mechanically flexible and electrically insulative.

6. The art tracker device of claim 1, wherein the microenvironment includes a volume at least partially encompassing the portion or the whole of the artistic work, where the volume comprises a range of 0 μm to 100 μm outward from a surface of the artistic work, or range of 0 μm to 10 mm outward from a surface of the artistic work, or a range of 0 μm to 10 cm outward from a surface of the artistic work.

7. The art tracker device of claim 1, wherein the external condition includes one or more of a temperature, a humidity, a barometric pressure, a concentration of particulates in air indicative of an air quality, an amount and/or frequency of light, a vibration, an applied strain or stress, or an instantaneous movement.

8. The art tracker device of claim 1, wherein the internal condition includes one or more of: a material property of one or more materials or one or more components of the artistic work, a mechanical force applied onto and/or propagating within the artistic work, an electrical property of one or more materials or one or more components of the artistic work, or a hydrophilicity or hydrophobicity of one or more materials or one or more components of the artistic work.

9. A method for monitoring health of an art work, comprising:
    detecting, by a plurality of sensors disposed on a contiguous substrate of a device that is attached to an artistic work or an accessory associated with the artistic work, one or both of an internal condition that impacts a region or material component of the artistic work itself and an external condition from a microenvironment of the artistic work that impacts a portion or a whole of the artistic work, wherein the contiguous substrate of the device includes two or more segments to attach to two or more distinct surfaces in two or more planes, respectively, of the artistic work or the accessory associated with the artistic work;
    processing, by a processor disposed on the contiguous substrate of the device, data associated with the internal condition of the artistic work, the external condition from the microenvironment of the artistic work, or both the internal condition and the external condition to produce health information about the artistic work; and
    wirelessly transmitting to a remote device, by a transmitter disposed on the contiguous substrate of the device, the processed data associated with the internal condition of the artistic work, the external condition from the microenvironment of the artistic work, or both the internal condition and the external condition.

10. The art tracker device of claim 1, wherein the substrate includes at least three modular sections that are able to fold in multiple directions for each of the at least three modular sections to have varying orientations with respect to each other, including a first section configured to attach to the artistic work or the accessory in a first plane, a second section configured to attach to the artistic work or the accessory in a second plane, and a third section configured to attach to the artistic work or the accessory in a third plane, wherein the first plane, the second plane, and the third plane are perpendicular to each other.

11. The art tracker device of claim 1, wherein the power supply unit further includes a power generation device in electrical communication with the control circuit, wherein the control circuit is operable to control the electrical power drawn from the power source by the electronic components of the device and control electrical power generated from the power generation device to supply generated electrical energy to the power source.

12. The art tracker device of claim 11, wherein the data processing unit is configured to command the control circuit to allow the electrical power to be drawn from the power source by the electronic components of the device based on the data processed from outputs of the plurality of sensors, wherein the data processing unit is configured to receive external data from an external device in a facility where the artistic work or the accessory is located and to process the external data with the data associated with one or more conditions of the artistic work or the accessory and generate an instruction to command the control circuit.

13. A method for monitoring health of an art work, comprising:
  detecting, by a plurality of sensors disposed on a contiguous substrate of a device that is attached to an artistic work or an accessory associated with the artistic work, one or both of an internal condition that impacts a region or material component of the artistic work itself and an external condition from a microenvironment of the artistic work that impacts a portion or a whole of the artistic work, wherein the contiguous substrate of the device includes two or more segments to attach to two or more distinct surfaces in two or more planes, respectively, of the artistic work or the accessory associated with the artistic work;
  processing, by a processor disposed on the contiguous substrate of the device, data associated with the internal condition of the artistic work, the external condition from the microenvironment of the artistic work, or both the internal condition and the external condition to produce health information about the artistic work; and
  wirelessly transmitting to a remote device, by a transmitter disposed on the contiguous substrate of the device, the processed data associated with the internal condition of the artistic work, the external condition from the microenvironment of the artistic work, or both the internal condition and the external condition.

14. The method of claim 13, wherein the detecting includes:
  sensing, by a first sensor disposed on a first segment of the contiguous substrate attached to the artistic work or the accessory at a first plane, a first parameter associated with the internal condition and/or the external condition, and
  sensing, by a second sensor disposed on a second segment of the contiguous substrate attached to the artistic work or the accessory at a second plane different than the first plane, a second parameter associated with the internal condition and/or the external condition.

15. The method of claim 13, comprising:
  processing, by the processor, the one or both of the internal condition and the external condition to control an amount of electrical power from a power source of the device to supply electronic components of the device.

16. The method of claim 15, comprising:
  commanding, by the processor, a control circuit of the device to allow the electrical power to be drawn from the power source by the electronic components of the device based on the processed data associated with the internal condition of the artistic work, the external condition from the microenvironment of the artistic work, or both the internal condition and the external condition.

17. The method of claim 16, wherein the device includes a power generation device in electrical communication with the control circuit, wherein the method comprises:
  controlling, by the processor, electrical power generated from the power generation device to supply electrical energy to the power source; and
  commanding, by the processor, the control circuit to allow the electrical power to be drawn from the power source by the electronic components of the device based on the processed data associated with the internal condition of the artistic work, the external condition from the microenvironment of the artistic work, or both the internal condition and the external condition.

18. The method of claim 17, wherein the power generation device includes one or both of a solar cell and a fuel cell, wherein the power source includes a battery.

19. The method of claim 13, wherein the health information is included in a non-fungible token (NFT) associated with a unique identifier of the artistic work in a blockchain.

20. The method of claim 13, comprising:
  determining, by the processor, a safety level of the health information based on a comparative analysis of the health information with threshold values associated with the internal condition and the external condition.

21. The method of claim 20, comprising:
  analyzing, by the processor, whether the safety level is exceeds at least one of the threshold values that is indicative of a danger to the artistic work.

22. The method of claim 21, comprising:
  receiving, by the processor, external data from an external device in a facility where the artistic work is located;
  processing, by the processor, the external data with the health information and/or the safety level; and
  transmitting, by the transmitter, a control signal to the external device to instruct the external device to change a condition in the facility.

23. The method of claim 21, comprising:
  receiving, by the processor, external data from an external device in a facility where the artistic work is located;
  processing, by the processor, the external data with the health information and/or the safety level;
  generating, by the processor, an alert instruction; and
  transmitting, by the transmitter, a signal to the remote device with the alert instruction, and/or
  generating, by an alert unit comprising at least one of a visual indicator or auditory indicator, an alert signal from the device.

24. The method of claim 13, wherein the external condition includes one or more of a temperature, a humidity, a barometric pressure, a concentration of particulates in air indicative of an air quality, an amount and/or frequency of light, a vibration, an applied strain or stress, or an instantaneous movement.

25. The method of claim 13, wherein the internal condition includes one or more of: a material property of one or more materials or one or more components of the artistic work, a mechanical force applied onto and/or propagating within the artistic work, an electrical property of one or more materials or one or more components of the artistic work, or a hydrophilicity or hydrophobicity of one or more materials or one or more components of the artistic work.

\* \* \* \* \*